(12) United States Patent
Burns et al.

(10) Patent No.: US 12,157,564 B2
(45) Date of Patent: Dec. 3, 2024

(54) AERONAUTICAL APPARATUS

(71) Applicant: Aerhart, LLC, Malibu, CA (US)

(72) Inventors: Kevin Burns, Malibu, CA (US); Diana Brehob, Dearborn, MI (US)

(*) Notice: Subject to any disclaimer, the term of this patent is extended or adjusted under 35 U.S.C. 154(b) by 0 days.

(21) Appl. No.: 17/474,025

(22) Filed: Sep. 13, 2021

(65) Prior Publication Data

US 2021/0403161 A1 Dec. 30, 2021

Related U.S. Application Data

(63) Continuation-in-part of application No. 16/027,290, filed on Jul. 4, 2018, now Pat. No. 11,117,657.

(51) Int. Cl.
*B64C 29/00* (2006.01)
*B64C 3/38* (2006.01)
(Continued)

(52) U.S. Cl.
CPC ............ *B64C 29/0033* (2013.01); *B64C 3/38* (2013.01); *B64C 5/00* (2013.01); *B64C 9/02* (2013.01);
(Continued)

(58) Field of Classification Search
CPC .... B64C 3/38; B64C 5/00; B64C 9/02; B64C 25/34; B64C 29/0033; B64C 39/08;
(Continued)

(56) References Cited

U.S. PATENT DOCUMENTS 4,856,736 A 8/1989 Adkins
5,758,844 A * 6/1998 Cummings ......... B64C 29/0033
244/66
(Continued)

FOREIGN PATENT DOCUMENTS

EP 3263456 B1 3/2018
JP 2018-020384 A 3/2018
(Continued)

OTHER PUBLICATIONS

Ripmax Transition VTOL Assembly Instructions, http:///www.ripmax.com/Instructions/a-rmx200.pdf, last visited Jul. 2, 2018.
(Continued)

Primary Examiner — Tye William Abell
(74) Attorney, Agent, or Firm — Diana D. Brebob; Brebob Law, PLLC

(57) ABSTRACT

An aeronautical apparatus is disclosed that has two pairs of wings: an aft pair and a fore pair. Each wing has a thrust-angle motor. An assembly is coupled to each thrust-angle motor. Assemblies coupled to the wings have a propeller motor with a propeller and a control surface. The control surface provides lift when in forward flight. In vertical flight or hovering, the control surface, if it remains fixed with respect to the fuselage, i.e., in the position which provides lift in forward flight, produces significant drag. However, by rotating the control surfaces with the propeller motor, the drag from the control surfaces is significantly reduced. The control surfaces are outboard the propellers in some embodiments and inboard in others. In the latter case, the control surface is part of the trailing edge of the wing.

22 Claims, 19 Drawing Sheets

(51) Int. Cl.

| | |
|---|---|
| *B64C 5/00* | (2006.01) |
| *B64C 9/02* | (2006.01) |
| *B64C 25/34* | (2006.01) |
| *B64C 39/08* | (2006.01) |
| *B64D 27/24* | (2006.01) |
| *B64D 29/02* | (2006.01) |
| *B64D 31/00* | (2006.01) |
| *B64U 10/20* | (2023.01) |
| *B64U 50/13* | (2023.01) |
| *B64U 50/19* | (2023.01) |

(52) U.S. Cl.
CPC .............. *B64C 25/34* (2013.01); *B64C 39/08* (2013.01); *B64D 27/24* (2013.01); *B64D 29/02* (2013.01); *B64D 31/00* (2013.01); *B64U 10/20* (2023.01); *B64U 50/13* (2023.01); *B64U 50/19* (2023.01)

(58) Field of Classification Search
CPC ........ B64D 27/24; B64D 29/02; B64D 31/00; B64U 30/20; B64U 10/25; B64U 50/19
See application file for complete search history.

(56) References Cited

U.S. PATENT DOCUMENTS

| | | | |
|---|---|---|---|
| 9,561,849 B2 | 2/2017 | Welsh | |
| 9,650,134 B2 | 5/2017 | Chappell | |
| 10,252,797 B2* | 4/2019 | Vondrell | B64C 27/08 |
| 10,293,914 B2 | 5/2019 | Wiegand | |
| 10,301,016 B1* | 5/2019 | Bondarev | B64C 29/0033 |
| 10,597,133 B2 | 3/2020 | Wiegand | |
| 10,773,802 B2 | 9/2020 | Finlay et al. | |
| 2011/0315809 A1* | 12/2011 | Oliver | B64C 39/08 |
| | | | 244/12.4 |
| 2012/0234968 A1* | 9/2012 | Smith | B64C 29/0033 |
| | | | 244/12.3 |
| 2015/0314865 A1 | 11/2015 | Bermond | |
| 2015/0344134 A1* | 12/2015 | Cruz Ayoroa | B64C 39/024 |
| | | | 244/48 |
| 2016/0023754 A1 | 1/2016 | Wiegand | |
| 2016/0311522 A1 | 10/2016 | Wiegand | |
| 2017/0144771 A1* | 5/2017 | Lukaczyk | B64D 27/26 |
| 2017/0274996 A1 | 9/2017 | Frolov et al. | |
| 2017/0313410 A1 | 11/2017 | Ismagilov et al. | |
| 2018/0141655 A1* | 5/2018 | Wall | B64C 29/02 |
| 2018/0215465 A1* | 8/2018 | Renteria | B64C 25/10 |
| 2018/0281941 A1* | 10/2018 | Hutson | B64C 39/024 |
| 2018/0346111 A1* | 12/2018 | Karem | B64C 27/72 |
| 2019/0176981 A1* | 6/2019 | Gaillimore | B64C 3/32 |

FOREIGN PATENT DOCUMENTS

| | | |
|---|---|---|
| KR | 10-2004-0018614 A | 3/2004 |
| KR | 10-2017-0135577 A | 12/2017 |

OTHER PUBLICATIONS

Graupner Online Shop-Productinformation, http://shop.graupner.de/webuerp/AI?ARTN=9944.RTF., last visited Mar. 26, 2018.
Graupner X44 Manual, https://www.graupner.de/media/pdf/d4/aa/e2/99445a31137c08dc3.pdf, last visited Jul. 2, 2018.
Graupner X44 Webpage, http://shop.graupner.de/webuerp/AI?ARTN=9944.RTF&SessionCheck=4711&language=en, last visited Mar. 22, 2018.
https://hackaday.com/2017/05/26/the-tri-rotor-drone-why-has-it-been-overlooked/last visited Jun. 21, 2021.
Bell Boeing Quad TiltRotor—Wikipedia.pdf last viewed Oct. 9, 2019.
Quad TiltRotor (QTR) aircraft development, New Atlas, Sep. 24, 2005.
"Numerical Investigation for the Longitudinal Stability of the Quad Lift Propeller UAV," Lee, Y., Choi, J., and Kim, C., Tenth International Conference on Computational Fluid Dynamics (ICCFD10), Barcelona, Spain, Jul. 9-13, 2018, ICCFD10-0262.

* cited by examiner

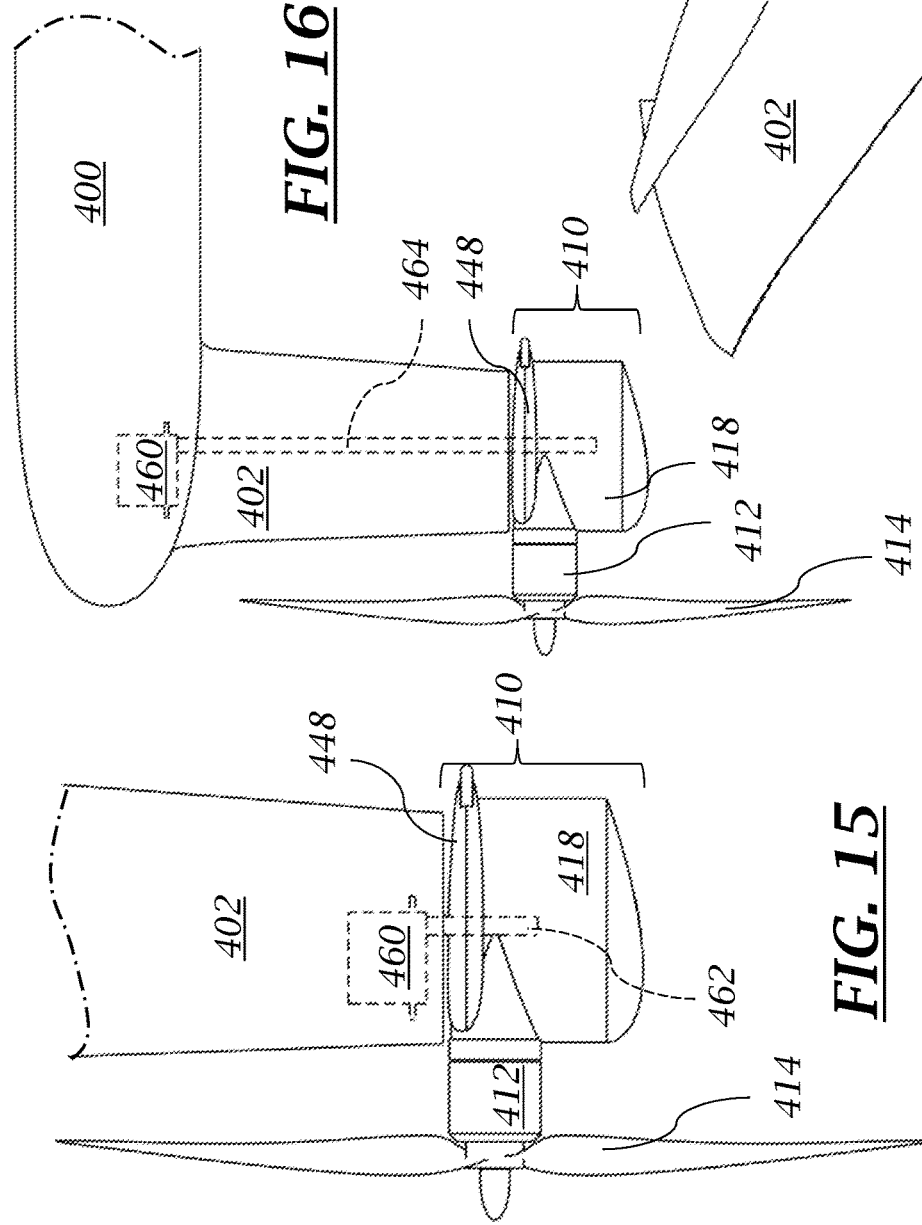
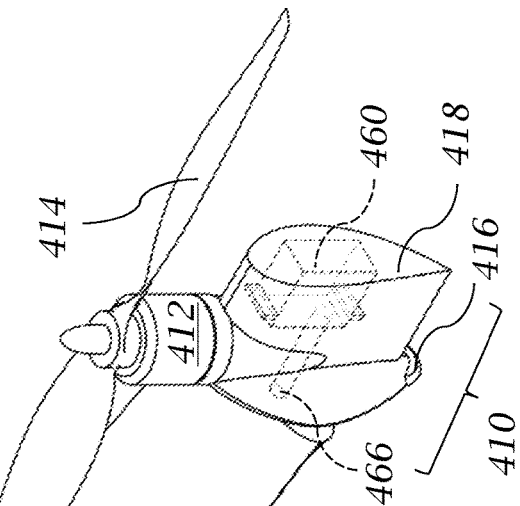
FIG. 15
FIG. 16
FIG. 17

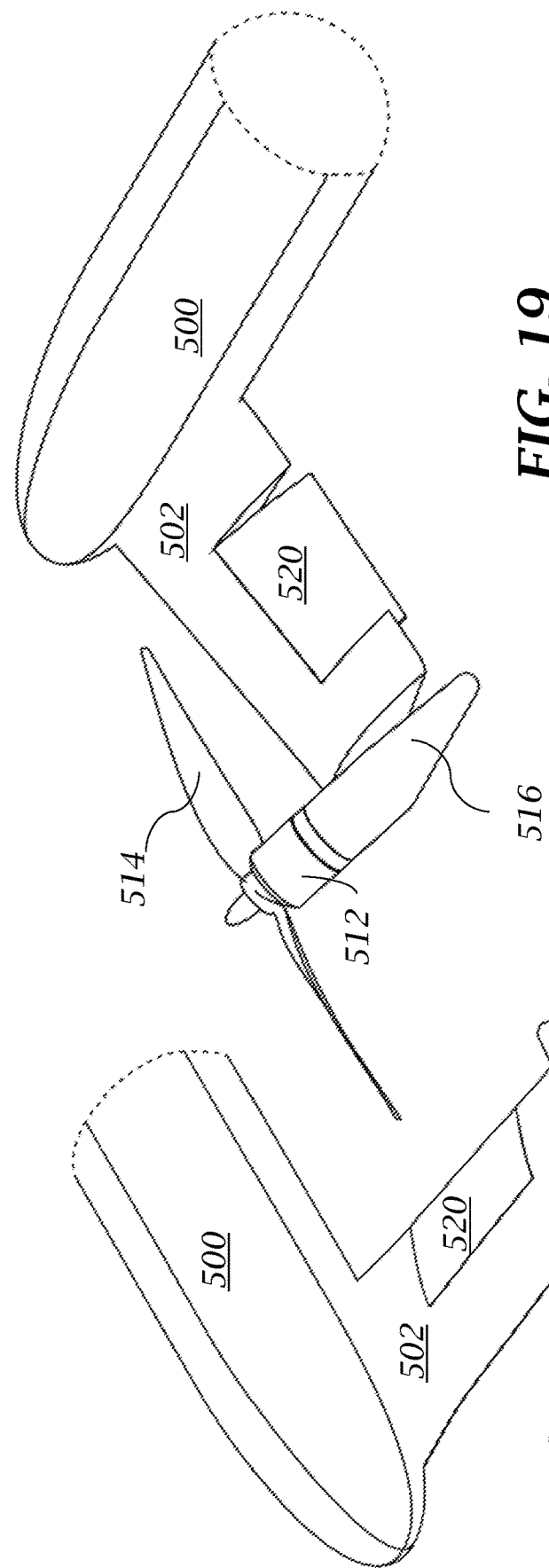

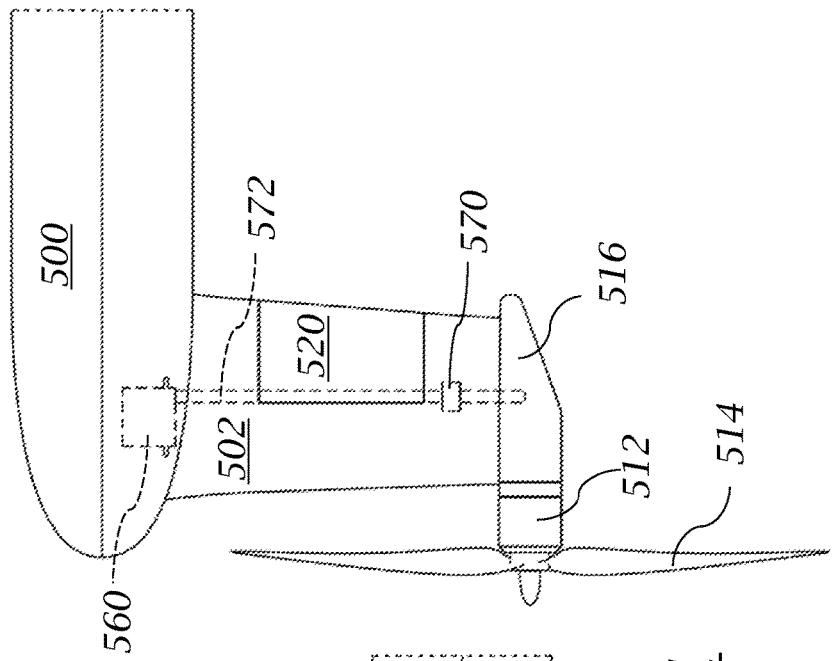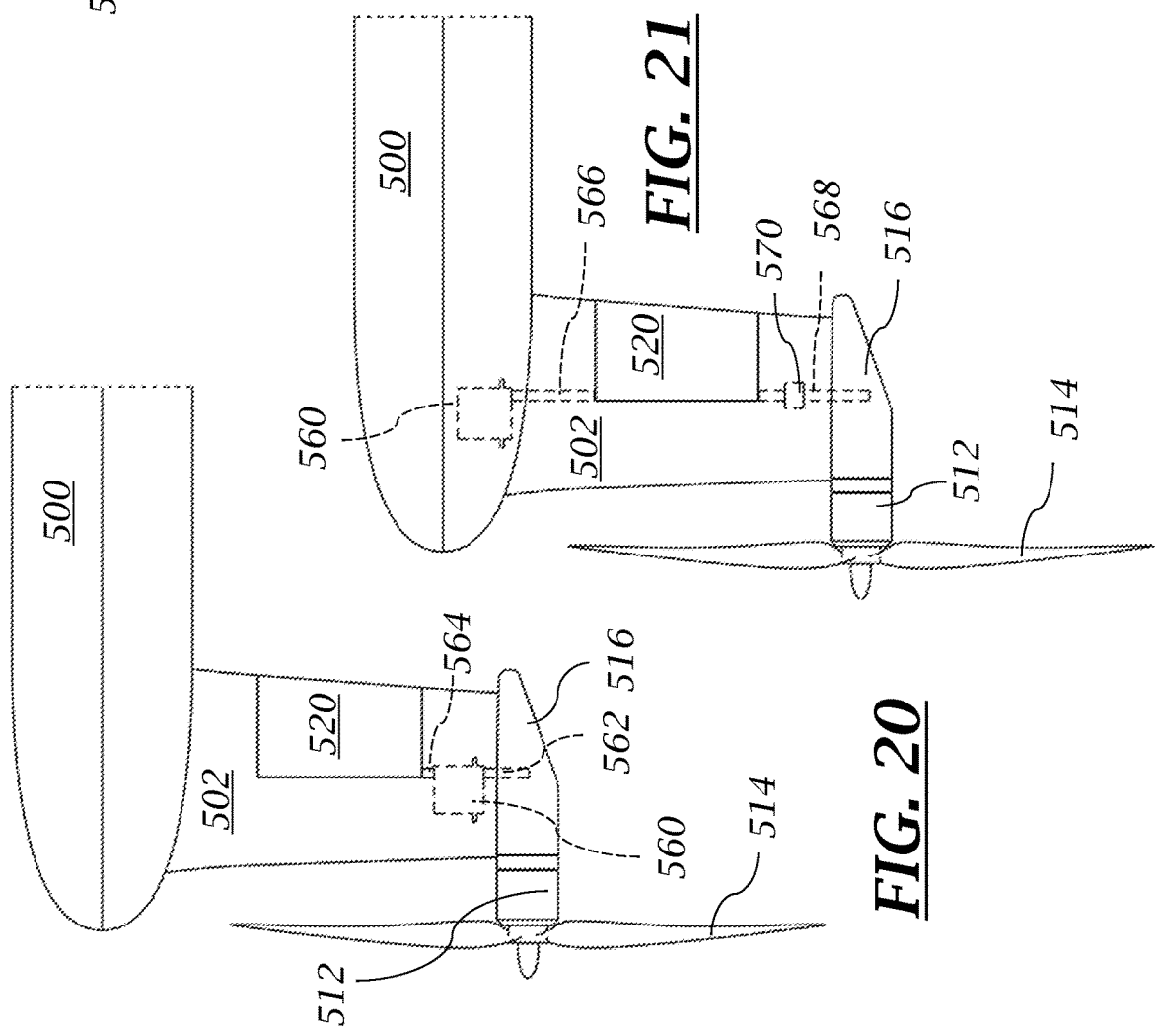

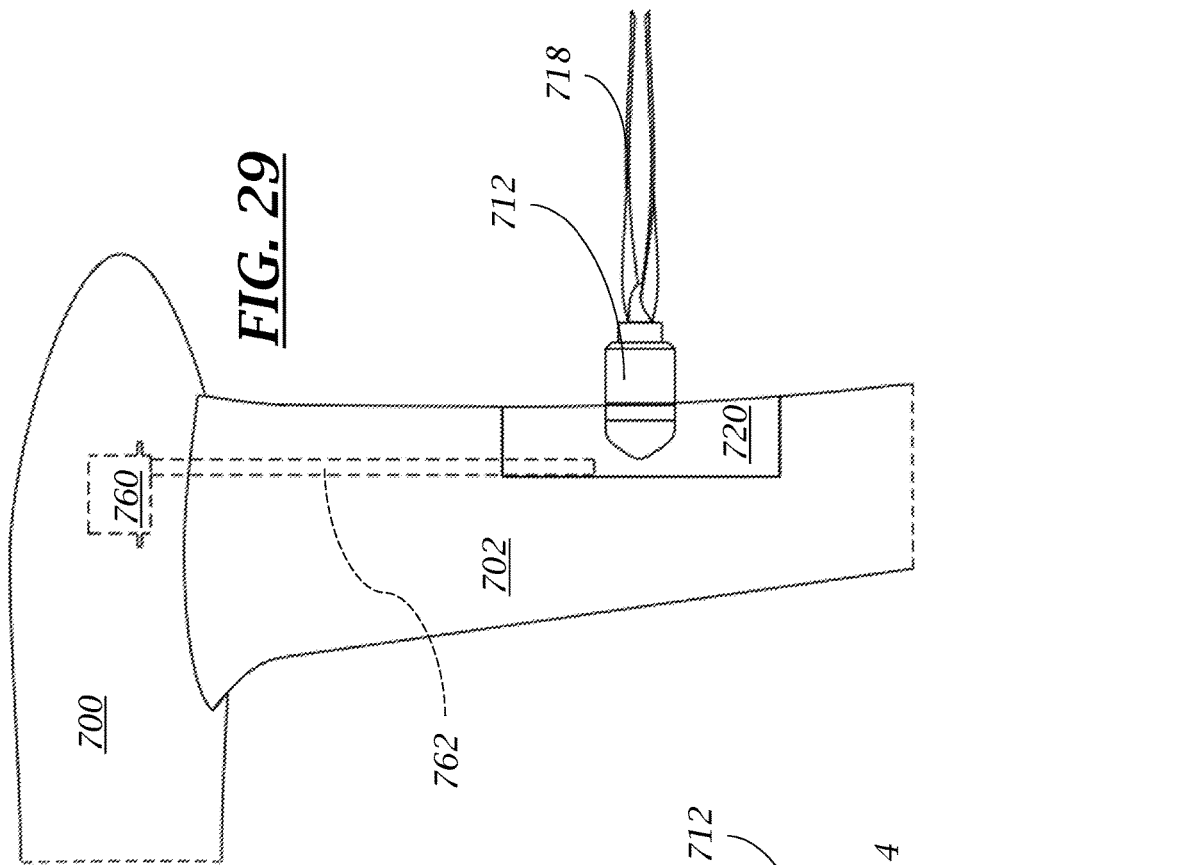
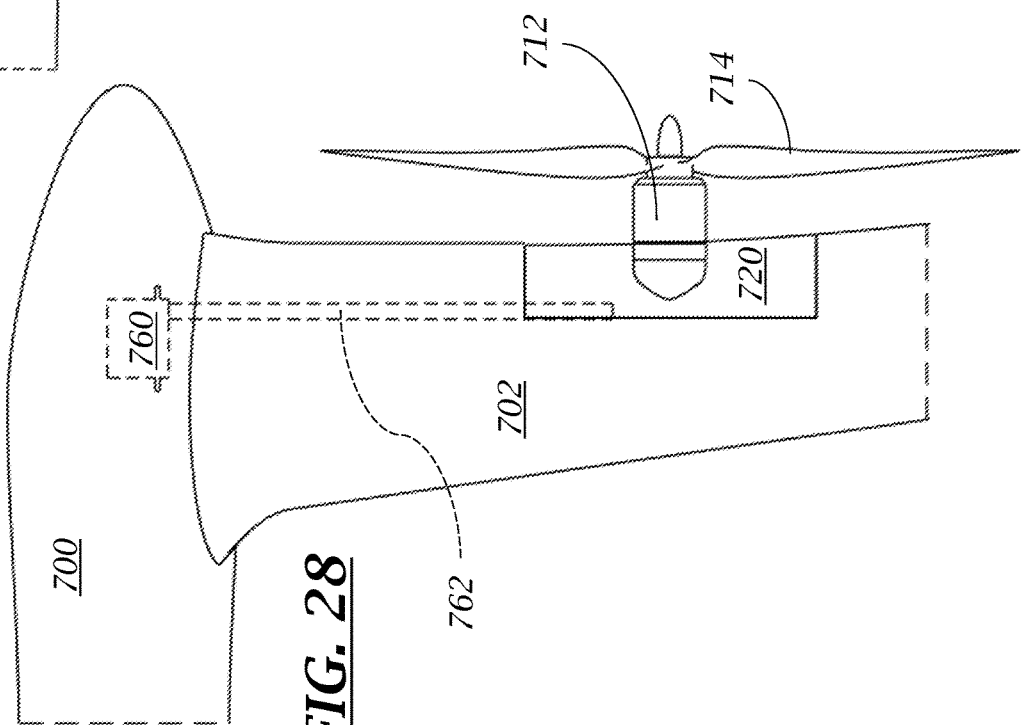

AERONAUTICAL APPARATUS

FIELD

The present disclosure relates to vertical take-off and landing (VTOL) aircraft, in particular aeronautical vehicles, commonly referred to as unmanned aerial vehicles (UAVs) or drones.

BACKGROUND

UAVs, more commonly called drones, particularly for aerial reconnaissance and small package delivery, are presently often covered by the press and are being designed and built by many researchers and developers. Such drones are typically powered by onboard batteries. One of the significant hurdles to overcome is range limitation due to the well-understood tradeoff between including more batteries to extend range, and the additional weight of those batteries requiring more lift, causing them to drain energy at a faster rate. Although the U in UAV stands for unmanned, the present disclosure applies to aeronautical vehicles that include passengers and/or crew. Herein, UAV and drone both refer to manned or unmanned aeronautical vehicles.

Drones for many purposes are VTOL devices. A common prior-art drone 10 configuration, as shown in FIG. 1, has a body 12 with four arms 14 extending outwardly in a plane, approximately evenly radially displaced. Each arm has a propeller motor housed within a nacelle 16. The propeller motor (not visible in FIG. 1) drives a propeller 18. The propellers are arranged to provide an upward thrust to drone 10 by pushing air downward in a direction that gravity nominally acts, as indicating by arrow 20. Drone 10 has landing feet 22.

A drone, such as the one shown in FIG. 1, takes-off, lands, hovers or adjusts its altitude by applying equal power to all propeller motors; adjusts its yaw rate by applying more power to propeller motors rotating in one direction and/or less to the ones rotating in the opposite direction; and adjusts its pitch or roll rates by applying more power to certain propeller motors and less power to those diametrically opposite. Thrust is varied by varying propeller speed in response to propeller motor power. The drone of FIG. 1 is a simple, light-weight device that hovers, takes-off, and lands well. However, in terms of energy, is inefficient. It has no airfoils that provide lift, thus the propellers provide the upward thrust to keep the drone inefficiently aloft as well as provide thrust for forward motion. In level flight, the direction of gravity is substantially normal to the plane in which the four arms 14 sit. To maneuver forward (or other maneuvers perpendicular to the direction of gravity), the drone is angled slightly by differing the power of diametrically opposite propeller motors so that the imbalance causes the direction of gravity to no longer be substantially normal to the plane in which the four arms sit.

A prior-art drone 30 that overcomes some of the disadvantages associated with the type of drone illustrated in FIG. 1 is shown in FIG. 2. Drone 30 has a fuselage 32 and four wings: right aft, left aft, right fore, and left fore. At tips of wing 34, a propeller motor is coupled. The propeller motor is not separately visible because it is housed within a nacelle 36. The propeller motors drive propellers 38. A thrust-angle position (which is to say an angle that the axis of rotation of a propeller or propeller motor makes with a longitudinal axis of a fuselage) of propellers 38, in FIG. 2, is shown in an intermediate thrust-angle position between a hovering thrust-angle position and a translational flight thrust-angle position. Propellers 38 (and propeller motors) of FIG. 2 can change their thrust-angle position to a hovering thrust-angle position similar to propellers' 18 thrust-angle position of FIG. 1. In FIG. 1, blades of propellers 18 rotate in a plane substantially parallel with the geometric plane in which arms 14 are located. Or stated another way, the axis of rotation of propellers 18 is substantially parallel to arrow 20 in level flight. Referring back to FIG. 2, the translational flight thrust-angle position of propellers 38 is what is the familiar thrust-angle position for a propeller-equipped airplane 50, as shown in FIG. 3. The airplane of FIG. 3 has a fuselage 52 with two wings 54 extending outward from fuselage 52. Wings 54 have engines 56 that drive propellers 58. The axis of rotation of engines 56 and propellers 58 is substantially parallel with the longitudinal axis of the fuselage. Referring back to FIG. 2, the axes of rotation of propellers 38 are about halfway between the axes of rotation of the propellers shown in FIGS. 1 and 3.

Not visible in FIG. 2 is a thrust-angle motor, i.e., motor that changes the propeller motors' and propellers' 38 thrust-angle position between the hovering and translational flight thrust-angle positions. In drone 30 of FIG. 2, a single thrust-angle motor controls all propellers' thrust-angle positions synchronously, i.e., they are ganged together with their thrust-angle positions mechanically linked.

Drone 30 of FIG. 2 can take-off vertically, hover, and land vertically when propellers' 38 thrust-angle positions are in the hover thrust-angle position. When propellers' 38 thrust-angle positions are changed to like that of propellers 58 in FIG. 3, drone 30 is in translational flight. When in translational flight, wings 34 act as airfoils to provide lift. If the thrust-angle position of propellers 18 in FIG. 1 were to be similarly changed, there would be no lift produced and drone 10 would descend.

A significant impediment to drones being used commercially is their inability to take on long missions before the batteries are discharged. It is desirable to reduce drag and to provide lift during forward flight to improve system efficiency to increase the mission possible on a single battery charge.

SUMMARY

Limitations in the prior art are addressed by an aeronautical apparatus that includes a fuselage having a longitudinal axis and a lateral axis, a first wing coupled to a right side of the fuselage, a second wing coupled to a left side of the fuselage, first and second thrust-angle motors each having an axis of rotation substantially parallel to the lateral axis of the fuselage, and first and second assemblies. The first assembly has: a first propeller motor with a first propeller coupled thereto and a first control surface. The second assembly has: a second propeller motor with a second propeller coupled thereto and a second control surface. The first thrust-angle motor is coupled between the first assembly and the first wing in one embodiment and between the first assembly and the fuselage in another embodiment. The second thrust-angle motor is coupled between the second assembly and the second wing in one embodiment and between the second assembly and the fuselage in another embodiment. The first assembly rotates with respect to the fuselage when the first thrust-angle motor is actuated; and the second assembly rotates with respect to the fuselage when the second thrust-angle motor is actuated.

The first control surface is located outboard of the first propeller motor and the second control surface is located outboard of the second propeller motor.

In some embodiments the first wing has two portions: a first fixed portion affixed to the fuselage and the first control surface, and the second wing has two portions: a second fixed portion affixed to the fuselage and the second control surface. The first assembly also includes a first shaft coupled to the first control surface so that the first assembly rotates unitarily. The second assembly has a second shaft coupled to the second control surface so that the second assembly rotates unitarily.

In some embodiments, the first control surface is coupled to the first assembly via a first differential rotational assemblage such that the first control surface rotates with respect to the first fixed portion of the first wing when the first thrust-angle motor is actuated and the second control surface is coupled to the second assembly via a second differential rotational assemblage such that the second control surface rotates with respect to the second fixed portion of the second wing when the second thrust-angle motor is actuated. The first differential rotational assemblage a first gearset or a first four-bar linkage. The second differential rotational assemblage is a second gearset or a second four-bar linkage.

In some embodiments, the first assembly also includes a first nacelle in which the first propeller motor is housed; and the second assembly also includes a second nacelle in which the second propeller motor is housed. An outboard end of the first control surface is affixed to the first nacelle. An outboard end of the second control surface is affixed to the second nacelle.

In some embodiments, the first and second thrust angle motors are located in the fuselage. In other embodiments, the first and second thrust-angle motors are disposed in the first and second wings, respectively. And, in yet other embodiments, the first and second thrust-angle motors are located in the first and second assemblies, respectively.

Some embodiments also include: a third wing coupled to the right side of the fuselage, a fourth wing coupled to the left side of the fuselage, third and fourth thrust-angle motors having an axis of rotation substantially parallel to the lateral axis; and third and fourth assemblies. The third assembly has a third propeller motor with a third propeller coupled thereto and a third control surface. The fourth assembly has a fourth propeller motor with a fourth propeller coupled thereto and a fourth control surface. In some applications, the third and fourth thrust-angle motors are coupled between the fuselage and the third or fourth wing, respectively. In other embodiments, the third thrust-angle motor is coupled between the third wing and the third assembly; and the fourth thrust-angle motor is coupled between the fourth wing and the fourth assembly.

In some cases, the first control surface is located outboard of the first propeller motor; the second control surface is located outboard of the second propeller motor; the third control surface is located outboard of the first propeller motor; and the fourth control surface is located outboard of the second propeller motor.

In some alternatives, the first wing has two portions: a first fixed portion affixed to the fuselage and the first control surface. The first assembly includes a first shaft coupled to the first control surface so that the first assembly rotates unitarily. The second wing has of two portions: a second fixed portion affixed to the fuselage and the second control surface. The second assembly includes a second shaft coupled to the second control surface so that the second assembly rotates unitarily. The third wing has two portions: a third fixed portion affixed to the fuselage and the third control surface. The third assembly includes a third shaft coupled to the third control surface so that the third assembly rotates unitarily. The fourth wing has two portions: a fourth fixed portion affixed to the fuselage and the fourth control surface. The fourth assembly includes a fourth shaft coupled to the fourth control surface so that the fourth assembly rotates unitarily.

The first wing includes two portions: a first fixed portion affixed to the fuselage and the first control surface. The first control surface is coupled to the first assembly via a first shaft and a first differential rotational element such that the first control surface rotates with the first shaft in response to the first thrust-angle motor actuating. The second wing includes two portions: a second fixed portion affixed to the fuselage and the second control surface. The second control surface is coupled to the second assembly via a second shaft and a second differential rotational element such that the second control surface rotates with the second shaft in response to the second thrust-angle motor actuating. The third wing includes two portions: a third fixed portion affixed to the fuselage and the third control surface. The third control surface is coupled to the third assembly via a third shaft such that the third control surface rotates with the third shaft in response to the third thrust-angle motor actuating. The fourth wing includes two portions: a fourth fixed portion affixed to the fuselage and the fourth control surface. The fourth control surface is coupled to the fourth assembly via a fourth shaft such that the fourth control surface rotates with the fourth shaft in response to the fourth thrust-angle motor actuating. The first differential rotational assembly is a first gearset or a first four-bar linkage. The second differential rotational assembly is a second gearset or a second four-bar linkage.

The first thrust-angle motor is located in one of the fuselage, the first wing, and the first assembly. The second thrust-angle motor is located in one of the fuselage, the second wing, and the second assembly. The third thrust-angle motor is located in one of the fuselage, the third wing, the and the third assembly. The fourth thrust-angle motor is located in one of the fuselage, the fourth wing, the and the fourth assembly.

In some embodiments the first assembly also has a first stabilizer and the second assembly has a second stabilizer.

The first wing includes a first main wing portion and a first rotatable wing portion and the second wing has a second main wing portion and a second rotatable wing portion. The first rotatable wing portion is the first control surface. The second rotatable wing portion is the second control surface. The first propeller motor is coupled to the first rotatable wing. The second propeller motor is coupled to the second rotatable wing.

The first assembly may further include a first landing element. The second assembly may further include a second landing element. The landing elements are wheels in some embodiments and landing feet in other embodiments.

In some embodiments, the first control surface is located outboard of the first propeller motor and the second control surface is located outboard of the second propeller motor. The first wing has two portions: a first fixed portion affixed to the fuselage and a third control surface. The second wing has two portions: a second fixed portion affixed to the fuselage and a fourth control surface. The third control surface is part of the first assembly and rotates in response to rotation of the first thrust-angle motor. The fourth control surface is part of the second assembly and rotates in response to rotation of the second thrust-angle motor.

Also disclosed in an aeronautical apparatus having a fuselage with a longitudinal axis and a lateral axis. First and third wings are coupled to a right side of the fuselage.

Second and fourth wings are coupled to a left side of the fuselage. First and second thrust-angle motors having an axis of rotation substantially parallel to the lateral axis of the fuselage. The apparatus also includes a first assembly having: a first propeller motor with a first propeller coupled thereto and a first control surface; and a second assembly having: a second propeller motor with a second propeller coupled thereto and a second control surface. The first thrust-angle motor is coupled between: the first assembly the fuselage or the first wing. The second thrust-angle motor is coupled between: the second assembly and the fuselage or the second wing. The first propeller motor rotates with the first thrust-angle motor; and the second propeller motor rotates with the second thrust-angle motor.

The first wing has a first main wing portion and a first rotatable wing portion. The second wing has a second main wing portion and a second rotatable wing portion. The first rotatable wing portion is the first control surface. The second rotatable wing portion is the second control surface. The first propeller motor is coupled to the first rotatable wing. The second propeller motor is coupled to the second rotatable wing.

In some embodiments, the aeronautical apparatus further includes: a third assembly having a third propeller motor with a third propeller coupled thereto; a fourth assembly having a fourth propeller motor with a fourth propeller coupled thereto; a third thrust-angle motor coupled between the third assembly and the third wing or the fuselage; a fourth thrust-angle motor coupled between the fourth assembly and the fourth wing or the fuselage. The third and fourth thrust-angle motors rotate with an axis of rotation parallel to the lateral axis. The third assembly rotates with the third thrust-angle motor. The fourth assembly rotates with the fourth thrust-angle motor. The third propeller has blades which are hinged such that when folded, tips of the blades extend away from the third propeller motor. The fourth propeller has blades which are hinged such that when folded, tips of the blades extend away from the fourth propeller motor.

In some embodiments, the aeronautical apparatus has a third propeller motor with a third propeller coupled thereto, a fourth propeller motor with a fourth propeller coupled thereto, and a third thrust-angle motor disposed in the fuselage and coupled to the third and fourth propeller motors. The third thrust-angle motor rotates around an axis that is parallel to the lateral axis. The third and fourth propeller motors rotate in response to actuation of the third thrust-angle motor.

In some cases, the aeronautical apparatus also includes a third assembly with: a third propeller motor with a third propeller coupled thereto and a third control surface and a fourth assembly with: a fourth propeller motor with a fourth propeller coupled thereto and a fourth control surface. A third thrust-angle motor is coupled between: the third assembly and the fuselage or the third wing. A fourth thrust-angle motor is coupled between the fourth assembly and the fuselage or the fourth wing. The axis of rotation of the third propeller motor changes in response to actuation of the third thrust-angle motor. The axis of rotation of the fourth propeller motor changes in response to actuation of the fourth thrust-angle motor.

The first control surface is located outboard of the first propeller motor; the second control surface is located outboard of the second propeller motor; the third control surface is located outboard of the first propeller motor; and the fourth control surface is located outboard of the second propeller motor.

Also disclosed is an aeronautical apparatus having a fuselage with a longitudinal axis and a lateral axis, a first wing coupled to a right side of the fuselage, a second wing coupled to a left side of the fuselage, a thrust-angle motor having an axis of rotation substantially parallel to the lateral axis of the fuselage, a first assembly having: a first propeller motor with a first propeller coupled thereto and a first control surface, a second assembly having: a second propeller motor with a second propeller coupled thereto and a second control surface. The thrust-angle motor is disposed in the fuselage and is coupled to the first and second assemblies. The first and second assemblies rotate in response to actuation of the thrust-angle motor.

The aeronautical apparatus has an electronic control unit (ECU) in electronic communication with: the thrust-angle motors, the propeller motors, and a plurality of sensors. The ECU commands: thrust-angle positions to the thrust-angle motors and propeller speeds propeller motors based on data from the plurality of sensors and a desired trajectory.

An advantage according to some embodiments of the disclosure is that the control surfaces provide lift while in forward flight mode, if the control surfaces were fixed with respect to the fuselage, the control surfaces cause a large drag. However, by rotating the cross-sectional area of the control surfaces in the direction of motion, i.e., in line with the propeller propulsive force, is significantly reduced, thereby reducing the drag substantially.

It is well-known in the art to attach vertical stabilizers on a component near the rear of the aircraft. Such vertical stabilizer is fixed, which is suitable for an aeronautical apparatus which flies in a forward mode exclusively. In the present embodiments, an aeronautical apparatus is disclosed that has the capability to switch between forward flight and vertical flight (VTOL and hovering). In such a case, a vertical stabilizer in a position for forward flight can obstruct the propellers when the aircraft is in vertical flight. By rotating the vertical stabilizer with the thrust-angle position of the propellers, clearance is maintained, and airflow over the stabilizer remains along the chord-line of the stabilizer which is the path with the lowest amount of drag.

As described above, a major reason that electrically-powered drones have not yet been more prominently available in the market place is due to insufficient mission length for many application. Embodiments in the present disclosure address reducing drag, one of the impediments to increasing mission length.

BRIEF DESCRIPTION OF THE DRAWINGS

FIGS. 15-17 show a portion of the aeronautical apparatus of FIGS. 13 and 14 with three embodiments for the thrust-angle motor;

FIG. 18 shows a front portion of an aeronautical apparatus in a translational flight mode with the propeller motor rotated forward;

FIG. 19 shows the aeronautical apparatus portion of FIG. 18 with a control input causing the thrust-angle of the propeller motor and the angle of the control surface to produce higher lift.

FIGS. 20-22 show the aeronautical apparatus portion of FIG. 18 with three embodiments for the thrust-angle motor;

FIG. 28 shows a rear portion of an aeronautical apparatus where the propeller motor is positioned aft of the control surface;

FIG. 29 shows the aeronautical apparatus portion of FIG. 28 with folding propellers which fold into a more streamlined position when the propeller motor is powered off in translational flight;

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Figure 4:
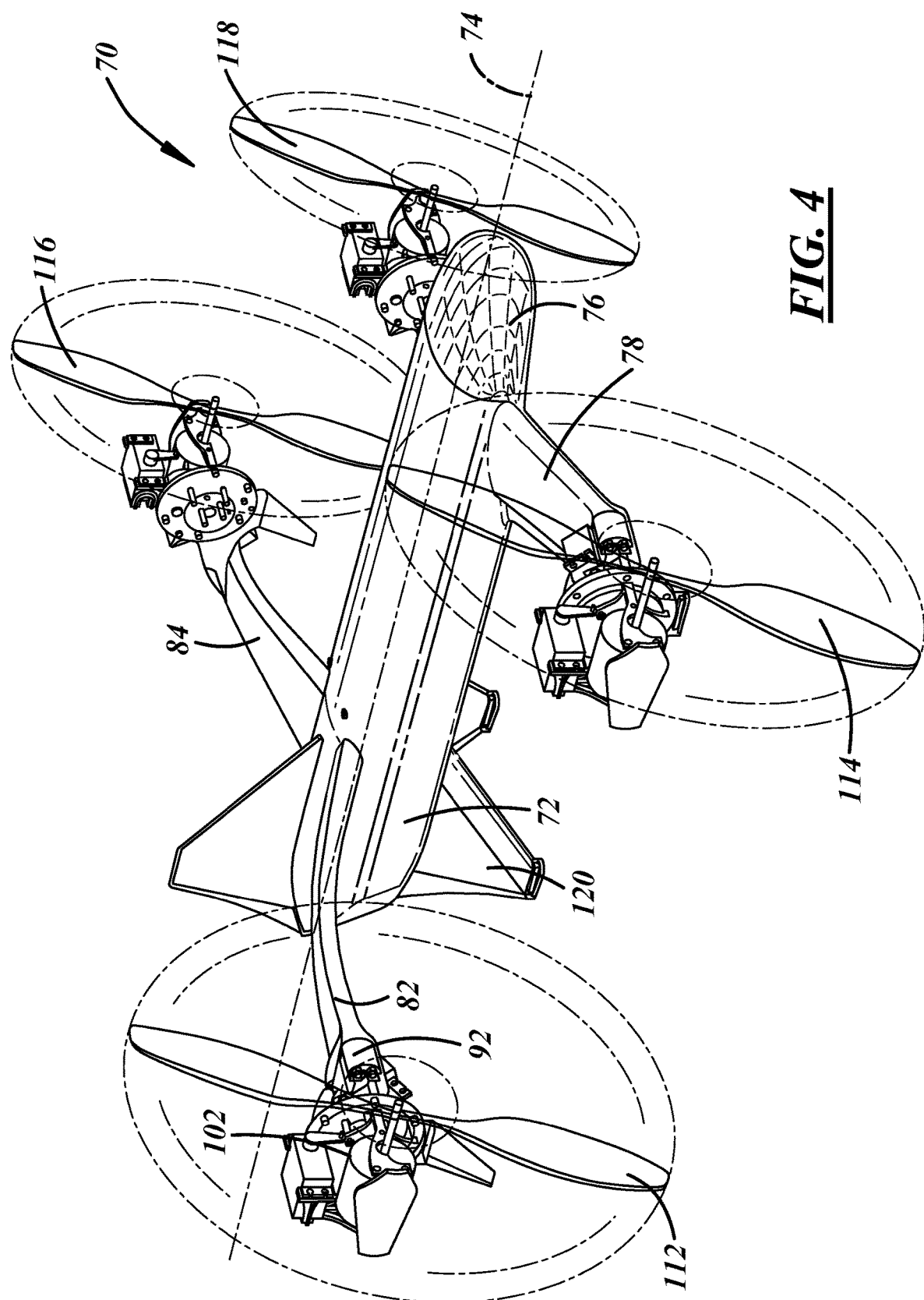
FIGS. 4 and 6 are isometric views of aerodynamic apparatuses according to embodiments of the present disclosure.

In FIG. 4, an isometric view of an aeronautical apparatus (UAV or drone) 70 is shown. Drone 70 has a fuselage 72 with a nose 76 at its fore. Fuselage 72 has a longitudinal axis 74. Four wings are coupled to fuselage 72: right fore 78, left fore (not visible), right aft 82, and left aft 84. In the embodiment in FIG. 4, fore wings are attached to fuselage 72 located below longitudinal axis 74 (or below a plane that includes longitudinal axis 74 and which the direction of gravity is normal to) with anhedral (wings pointing downward); and aft wings are attached to fuselage 72 above longitudinal axis 74 (or above a plane that includes longitudinal axis 74 and which the direction of gravity is normal to) with dihedral (wings pointing upward).

Figure 5:
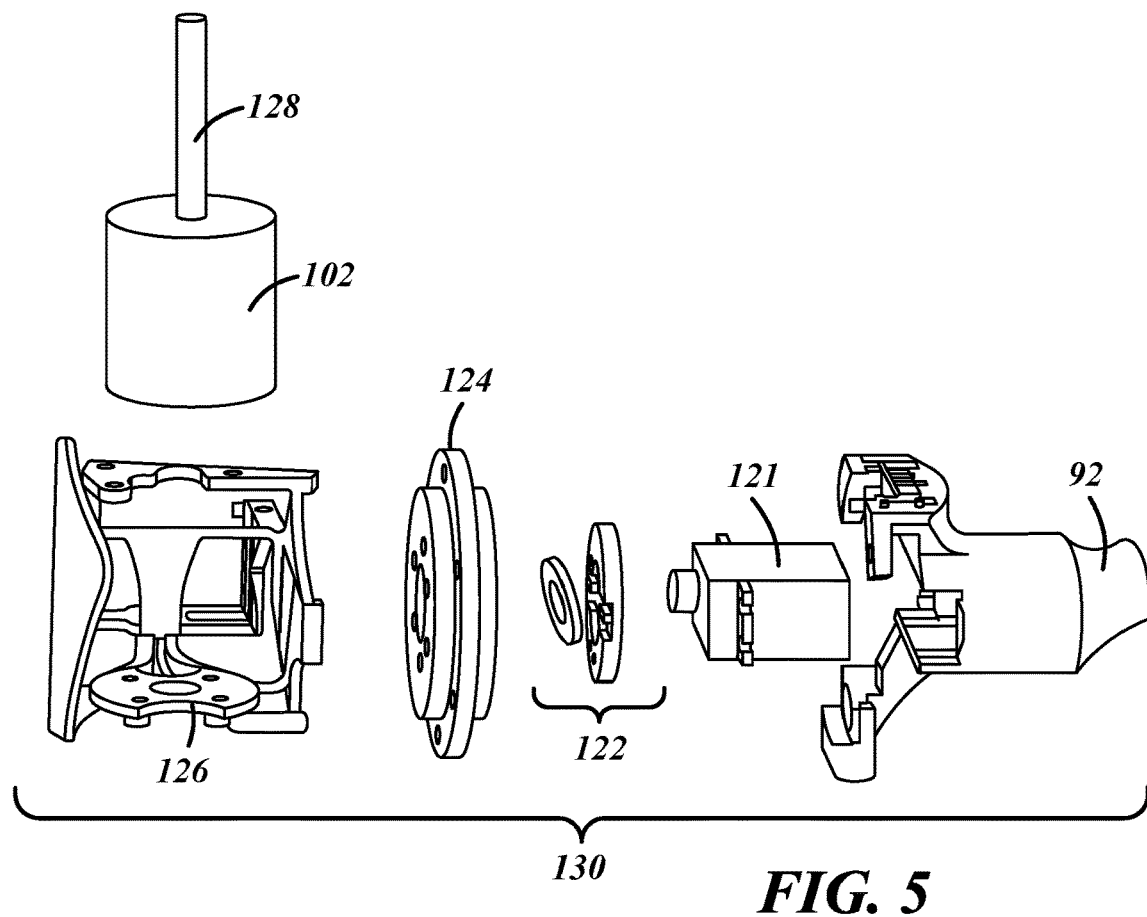
FIG. 5 is an exploded view of an embodiment of a propeller motor coupled to a thrust-angle motor coupled to a wingtip.

Coupled to a tip of right aft wing 82 in FIG. 4 is a thrust-angle motor (not visible) which is contained within a tip 92 of wing 82. A propeller motor 102 is coupled to the thrust-angle motor (not shown) within tip 92 and a propeller 112 is coupled to propeller motor 102. Assembly 130 of FIG. 5 shown in an exploded view are provided at the tips of each of the wings: right fore, right aft, left fore, and left aft, with those on the left being of a mirror-image configuration. In FIG. 5, an exploded view illustrates that a thrust-angle motor 121 is coupled to tip 92 of a wing (not shown). A slewing ring 124 has an adapter 122 provided between thrust-angle motor 121 and slewing ring 124. Typically, propeller motor 102 is contained within a nacelle (a streamlined housing), not shown in FIG. 5. An adaptor 126 is provided between slewing ring 124 and propeller motor 102. Coupled to propeller motor 102 is shaft 128. Propeller blades (not shown) are mounted on shaft 128.

Figure 6:
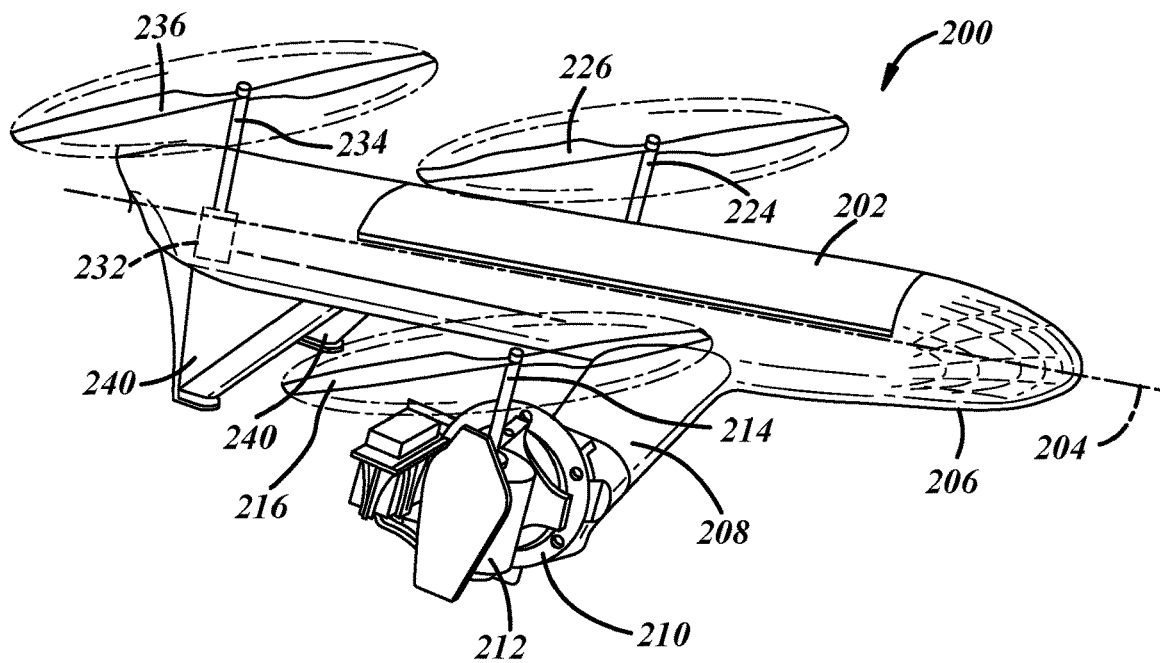

An alternative configuration of an aeronautical apparatus (drone) 200, is shown in FIG. 6. Drone 200 has a fuselage 202 that has a longitudinal axis 204 and a nose 206 at its fore. A right wing 208 is equipped with a thrust-angle motor (not shown) behind a slewing ring 210. Thrust-angle motor is coupled to a propeller motor 212 via the slewing ring 210 to change the thrust-angle position of propeller motor 212 (an assembly similar to assembly 130 of FIG. 5 is provided on each of the right and left wings, but mirror on the left). Propeller motor 212 is shown with an axis of rotation that is substantially perpendicular with longitudinal axis 204 and parallel with the direction gravity acts in level flight, which is a thrust-angle position for take-off, hovering and landing. The axis of rotation of propeller motor 212 can be positioned such that it is substantially parallel with longitudinal axis 204 for translational flight. Propeller motor 212 is coupled to shaft 214 to which a propeller 216 is mounted. The wing assembly (208, 210, 212, 214, 216, and the thrust-angle motor which is not visible) on the right side of fuselage 202 is provided on the left side of fuselage 202, although in a mirror-image configuration. The only parts of the left-wing assembly visible in FIG. 6 are shaft 224 and a propeller 226. A third propeller assembly is provided on fuselage 202. A propeller motor 232 housed within fuselage 202 is shown in phantom. Propeller motor 232 drives shaft 234 that has a propeller 236 mounted thereto. Propeller motor 232 is fixed, meaning that it does not have a thrust-angle motor. In some embodiments, it is provided with a propeller-pitch motor that changes the propeller-pitch angle of the blades. Propeller 236 is utilized primarily during take-offs, landings, and hovering. In some embodiments propeller motor 232, shaft 234 and propeller 236 are placed in front of right wing 208 and left wing (not visible) on the fuselage 202. In alternative embodiments, shaft 234 extends downward and propeller 236 is positioned below fuselage 202. During translational flight, propeller motor 232 is deactivated and propeller 236 presumably assumes a configuration in which the blades are substantially parallel with longitudinal axis 204. Propeller 236 becomes drag during forward flight. To avoid significant drag, propeller 236 has two blades that can assume a fore and aft configuration when in forward flight. In alternative embodiments, propeller 236 may have other blade numbers and configurations.

Figure 7:
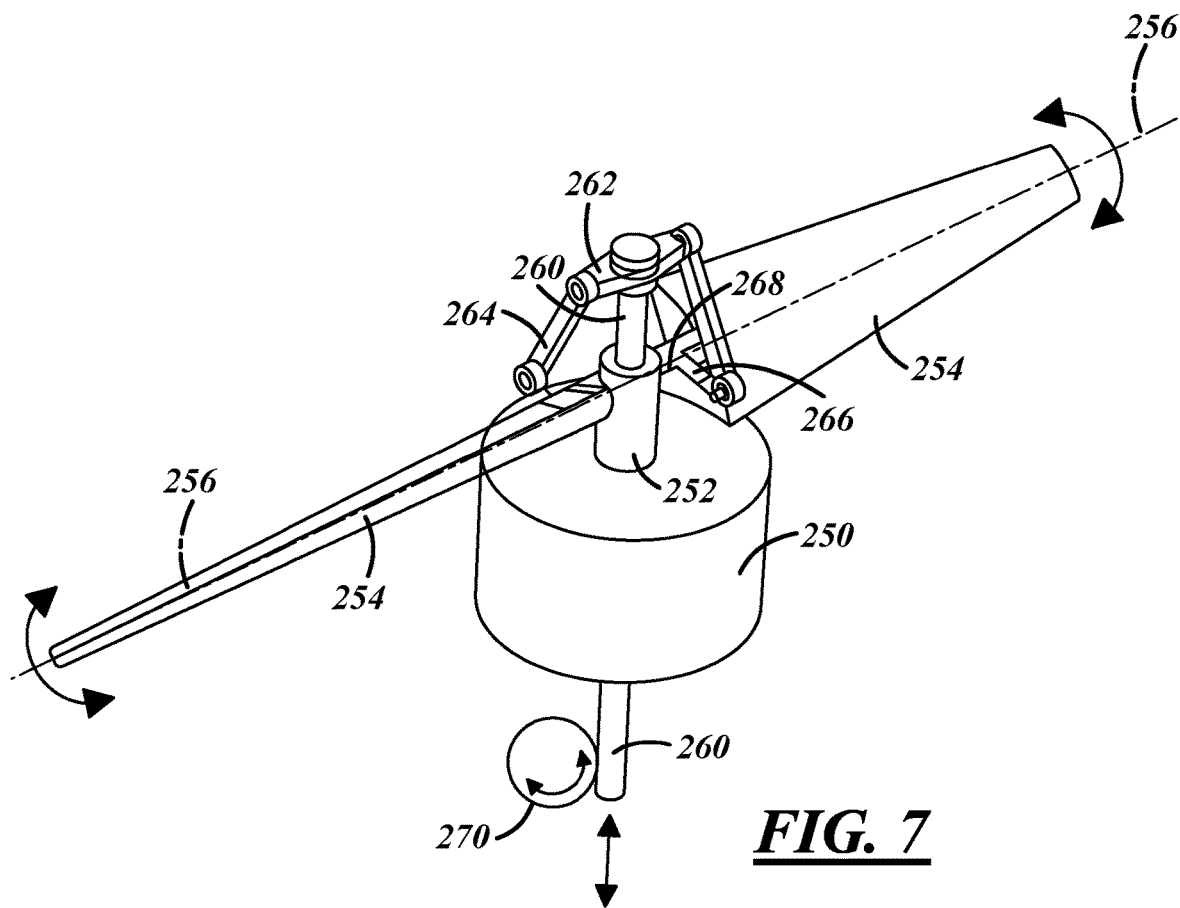
FIG. 7 is an embodiment of a mechanism to adjust pitch of the blades of a propeller.

As described above, some embodiments include mechanisms to change the pitch of the blades of the propeller, such as that shown in FIG. 7. A propeller motor 250 has a propeller motor output shaft 252 to which propeller blades 254 are coupled. Propeller motor output shaft 252 is hollow to allow a control shaft 260 to extend there through. Control shaft 260 is attached to a yoke 262. Yoke 262 has pins at its periphery that engage with control links 264. There is one pin and one control link per propeller blade. Control links 264 couple to yoke 262 at one end and at a bell crank 266 attached to the root of the propeller blades 254 at the other. Propeller blades 254 have a centerline 256. Control links 264 couple to bell crank 266 away from the centerline 256 so that when control links are moved, blade 254, which is attached to bell crank 266, rotates around a propeller drive shaft 268. Propeller drive shaft 268 is integrally formed with propeller motor output shaft 252 in the example shown in FIG. 7. When control shaft 260 is pulled downward, propeller blades 254 rotate around centerline 256; when control shaft 260 is pushed upward, propeller blades 254 rotate about centerline 256 in an opposite direction of that when shaft 260 is pulled downward. Rotation of an actuator 270 causes linear motion of control shaft 260. The mechanism for changing pitch of propeller blades shown in FIG. 7 is not intended to be limiting and is simply one example of a pitch control actuator.

Figure 1:
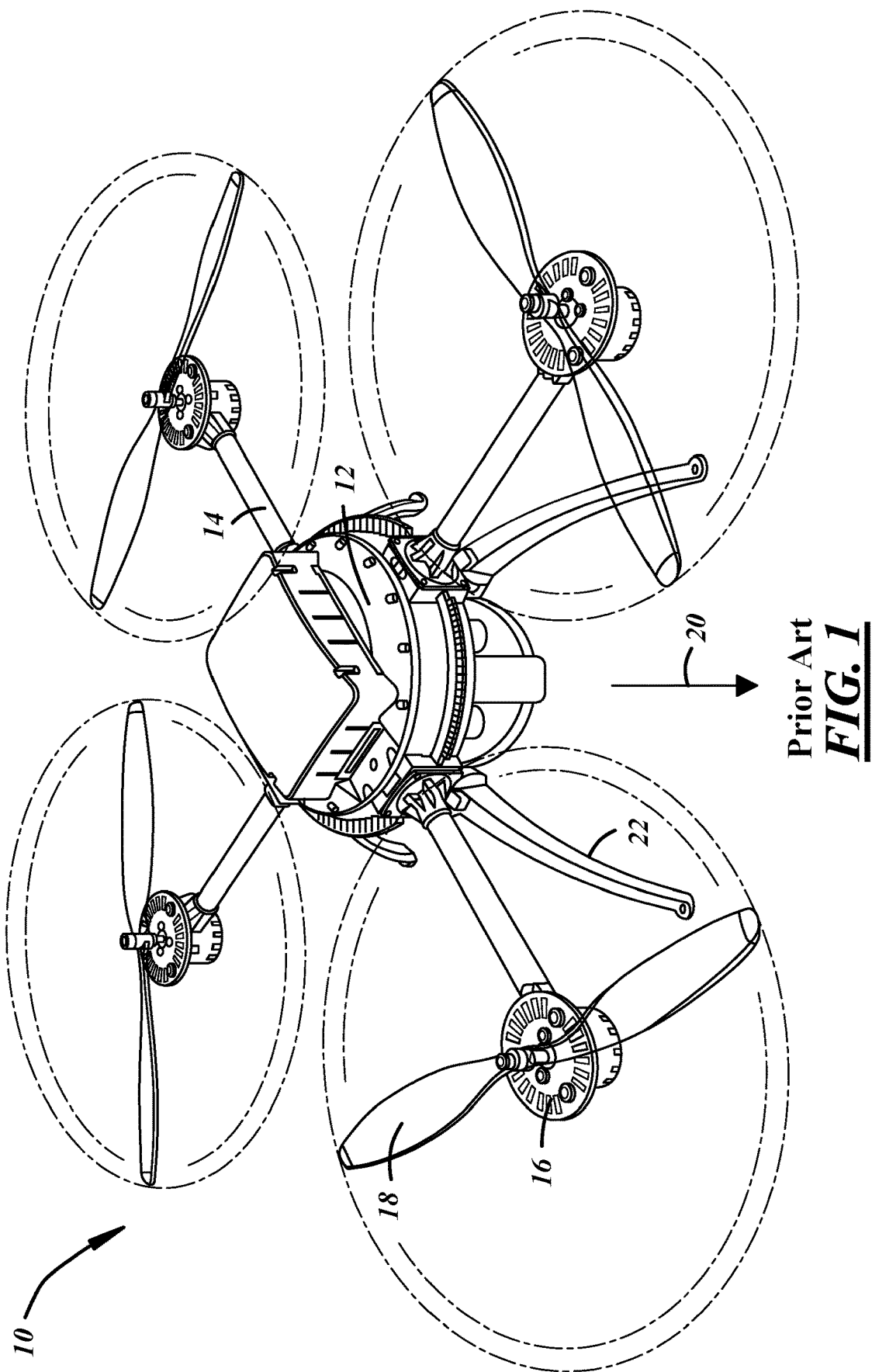
FIG. 1 is an illustration of a prior-art, four-propeller drone in which the propeller motors and thus propellers' axes of rotation are at a fixed thrust-angle position with respect to the body of the drone.
Figure 2:
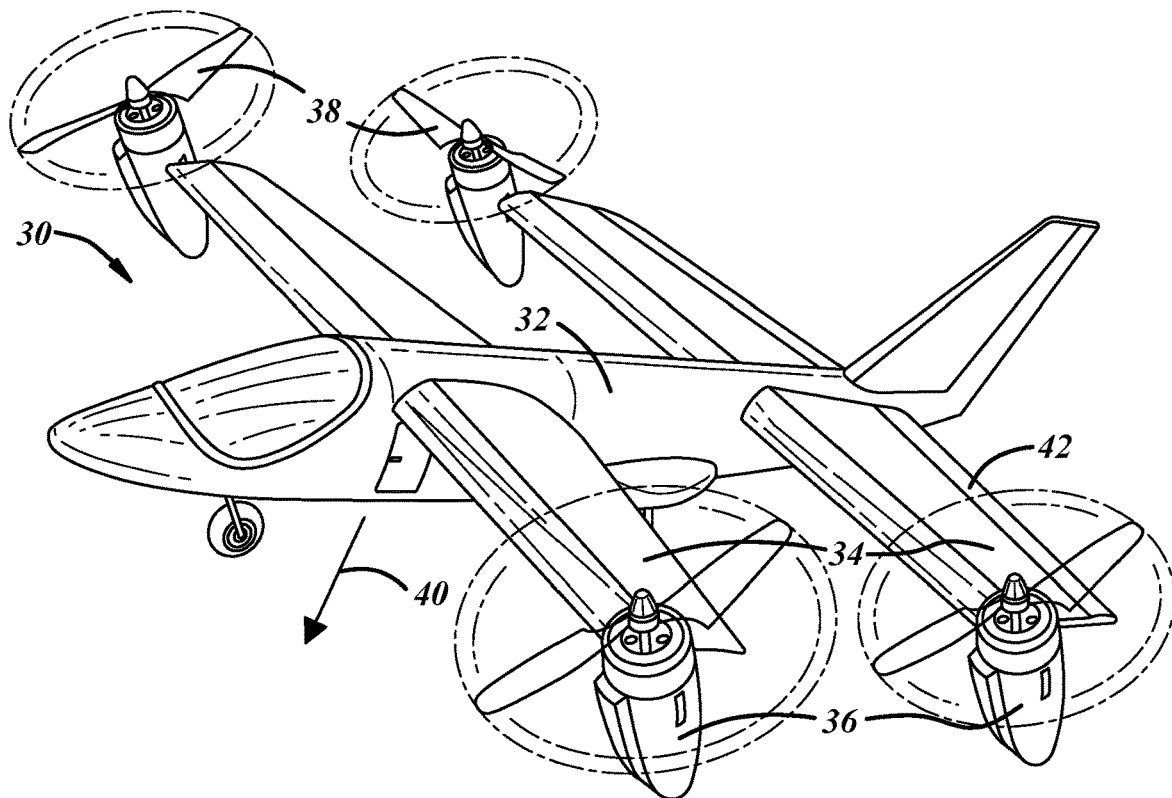
FIG. 2 is an illustration of a prior-art, four-propeller aeronautical apparatus with wings for providing lift during translational flight and a thrust-angle motor to change the thrust-angle positions of the propeller motors and propellers.
Figure 3:
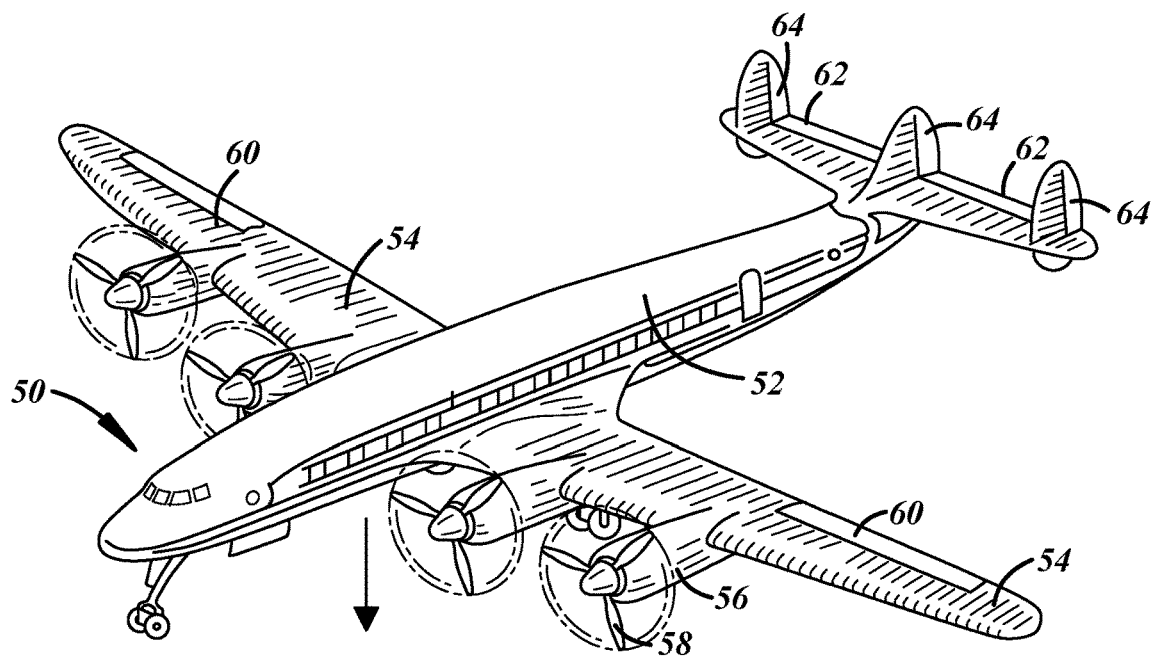
FIG. 3 is an illustration of an airplane with the propellers' thrust-angle position fixed in translational flight.
Figure 8:
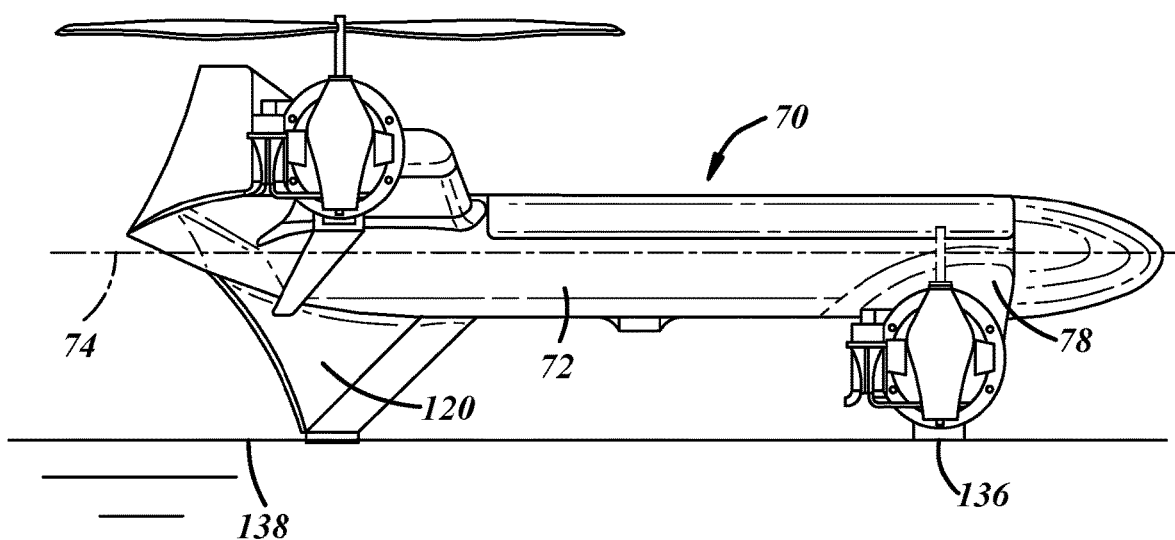
FIG. 8 is a side view of the aeronautical apparatus of FIGS. 4 and 6 resting on the ground.

Airplanes have landing gear. An aeronautical device with hovering capability need not have wheels for landing gear, instead, just stable surfaces. A side view of drone 70 on the ground 138 is shown in FIG. 8. The right fore wing 78 is partially visible in FIG. 8. Associated with the tip of wing 78 is a landing foot 136. Both right fore wing 78 and left fore wing (not visible in FIG. 8) have such a landing foot. In some embodiments, there are two stabilizers 120 that rest on ground 138. In alternative embodiments, only one stabilizer is provided at the aft with drone 70 resting on two landing feet 136 and stabilizer 120 in a triangular formation. Drone 70 has the right fore wing 78 and the left fore wing (not visible) coupled to the aircraft at a lower point on the fuselage 72. Because the axes of rotation of propellers 112, 114, 116, and 118 of FIG. 4 can be positioned such that they are parallel to the direction of gravity, propellers 112, 114, 116, and 118 of FIG. 4 do not run the danger of hitting the ground 138 of FIG. 8 and causing damage or throwing drone 70 out of its desired attitude. Drone 70 has an advantage in that stabilizer 120 and tip of right fore wing 78 and tip of left fore wing (not visible in FIG. 8) double as landing feet, presenting a minimal increase in weight and drag, particularly when compared to the prior-art landing wheels, such as those shown in FIGS. 2 and 3.

Figure 9:
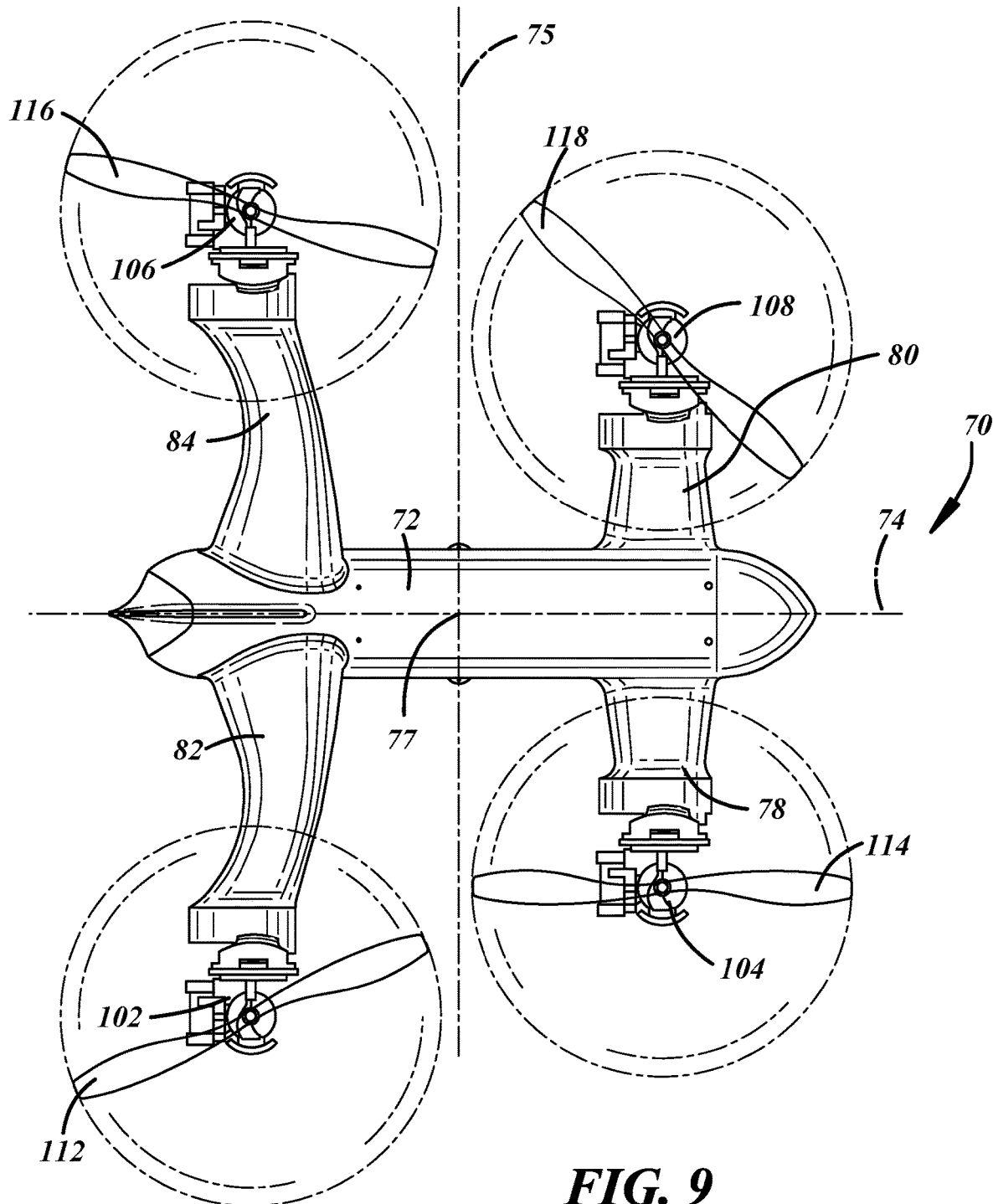
FIG. 9 is a plan view of the aeronautical apparatus of FIGS. 4 and 8.

In FIG. 9, a plan view of drone 70 is shown. Both the longitudinal axis 74 and a lateral axis 75 are shown. The center of mass 77 is located at the intersection of axes 74 and 75. Fore wings 78 and 80 are shorter than aft wings 82 and 84. It is desirable for the center of mass 77 of drone 70 to be at the center of lift while hovering and ahead of the center of pressure while in translational flight. While hovering, lift is provided by propellers 112, 114, 116, and 118 only. In translational flight, wings 78, 80, 82, and 84 provide the lift. To make the aerodynamic center behind the center of mass 77 for stable forward flight, the projected wing area of aft wings 82 and 84 is greater than the projected wing area of fore wings 78 and 80.

Figure 10:
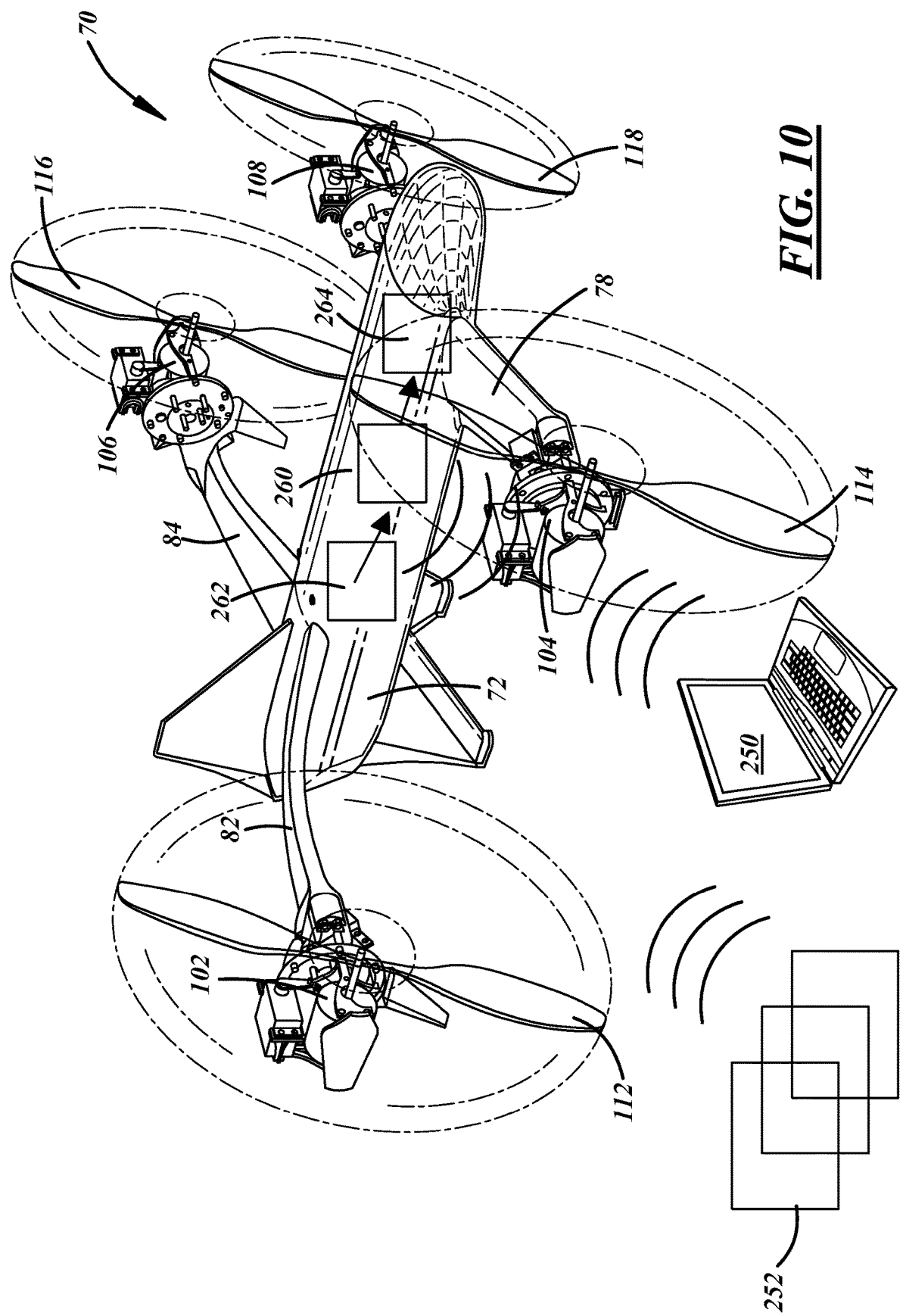
FIG. 10 is a schematic of the electronics controls on the aeronautical apparatus.

Referring now to FIG. 10, the basics of the control hardware is shown for drone 70. A laptop or other device 250 may be used to provide a desired route before taking off or an updated route while in flight (such as real-time control).

Device 250 may be communicating wirelessly through Bluetooth (when in range), radio, Wi-Fi, satellite, or any suitable system. Device 250 may use telephone cellular communication as well. Control of drone 70 may use other sensors 252, such as those that communicate weather information, wind speed, barometric pressure, etc. that can be transmitted wirelessly. Both device 250 and sensors 252 provide input data to electronic control unit (ECU) 260 onboard drone 70. In other alternatives, the ECU can be located remotely. ECU 260 is provided sensor data from a host of sensors 262 based on output from one or more of sensors detecting: air speed, ground speed, radar altimeter, barometric pressure, thermometer, magnetometer, global position, accelerometer, gyroscope, radar, LIDAR, sonar, infrared camera, visible wavelength camera, energy consumption rate, energy generation rate, and battery charge state. Based on the desired trajectory and the information from a plethora of sensors 262, ECU 260 determines what to command to the various motors: thrust-angle motors (not visible) to control the propellers' 112, 114, 116, and 118 and propeller motors' 102, 104, 106 and 108 thrust-angle positions at the tips of the wings 82, 78, 84 and 80 (wing 80 not visible in FIG. 10; refer to FIG. 9 to see wing 80) respectively, and propeller-pitch motors (not visible) and propeller motors 102, 104, 106 and 108 to control the thrust produced by each of the propellers 112, 114, 116, and 118, respectively. ECU 260 provides control signals 264 to the various motors. In some embodiments, ECU 260 includes motor drivers with sufficient current capability to drive the motors. In some embodiments, ECU 260 simply provides control signals that are sent to motor drivers which are electrically coupled to the motors. ECU 260 may communicate back to device 250 to provide images or other information, such as the state of battery charge.

It is desirable to have the ability to extend the thrust-angle position's range somewhat beyond the thrust-angle base positions shown in FIG. 9 (hovering thrust-angle base position) and FIG. 10 (translational thrust-angle base position) for control purposes. Approximately 10 degrees of additional thrust-angle control position near each end of travel allows the aeronautical apparatus to be controllable about the yaw axis and longitudinal direction while hovering (i.e. thrust-angle motors are substantially in the hovering thrust-angle base position) and controllable about the roll and pitch axes while in translational flight (i.e. thrust-angle motors are substantially in the translational flight thrust-angle base position).

Figure 11:
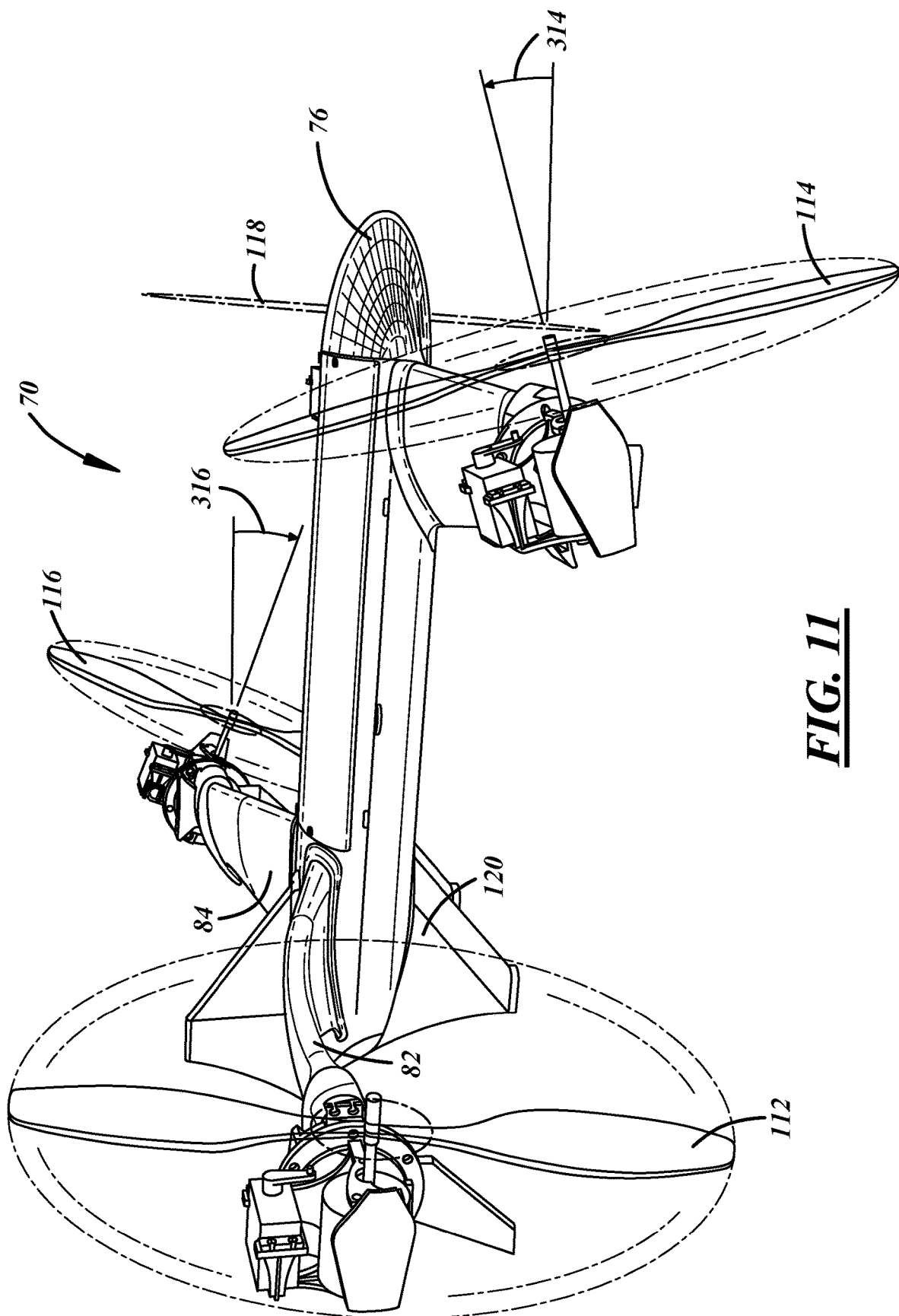
FIGS. 11 and 12 are examples of two combinations of thrust-angle positions for two specific maneuvers of the aeronautical apparatus.

In FIG. 11, one example of many possible combinations of thrust-angle positions is shown that causes drone 70 to undergo a maneuver. As shown in FIG. 11, drone 70 is in a level transitional attitude. Propellers 112 and 118 are in a translational thrust-angle base position with no thrust-angle control position, i.e., with an axis of rotation parallel to longitudinal axis 74. Propeller 114 is rotated backward, i.e., the axis of rotation is displaced from being parallel to the longitudinal axis by a thrust-angle control position denoted by 314. Propeller 116 is rotated forward, i.e., the axis of rotation is displaced from being parallel to the longitudinal axis by a thrust-angle control position denoted by 316. Drone 70 rolls left and pitches upward in response to the propellers being at the thrust-angle positions shown in FIG. 11. In some embodiments thrust-angle control positions 314 and 316 may be equal to each other in magnitude.

Figure 12:
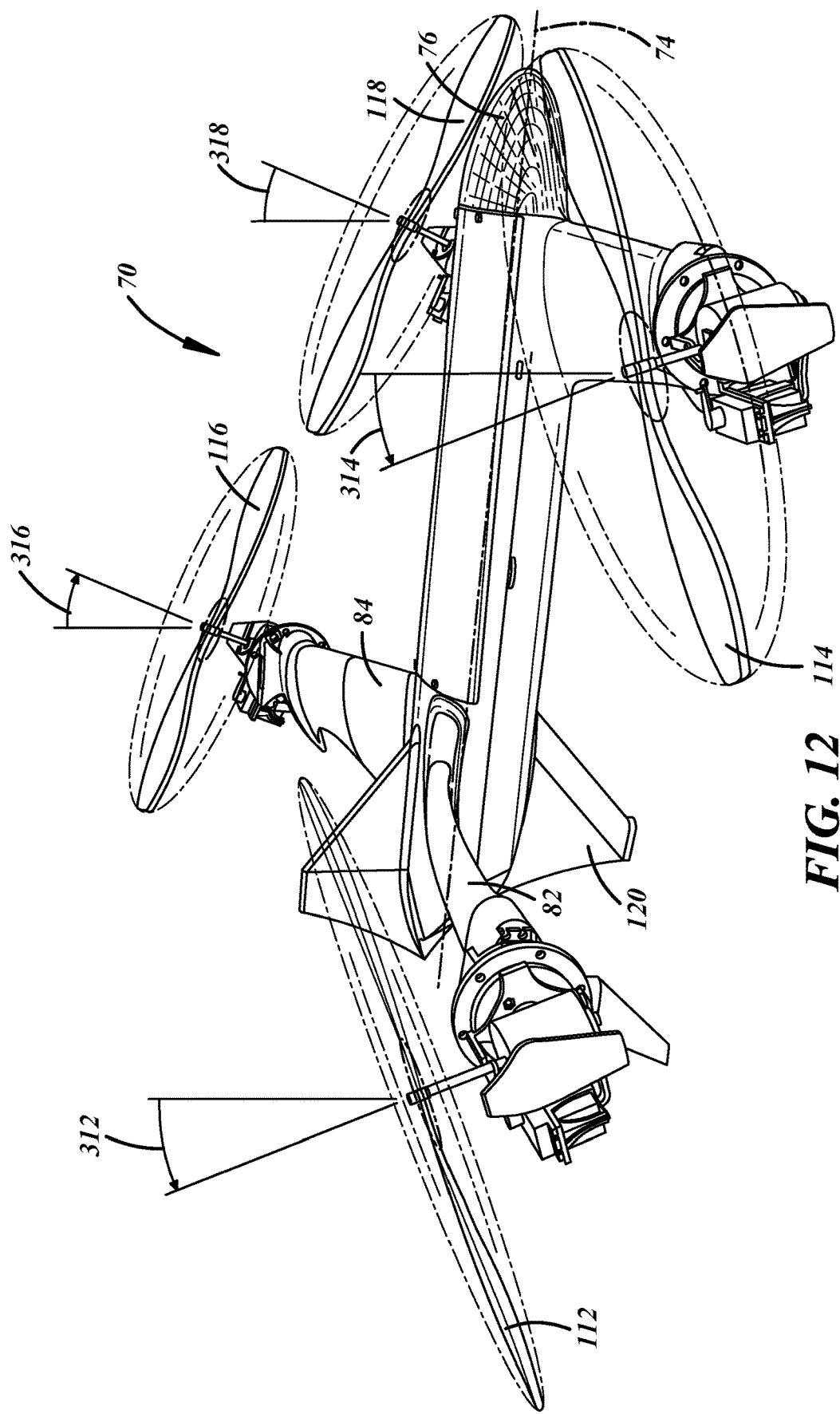

In FIG. 12, another example combination of thrust-angle positions is shown. When hovering, all of propellers 112, 114, 116, and 118 have a thrust-angle base position such that their axes of rotation are perpendicular to longitudinal axis 74 and parallel to the direction of gravity in level flight (should no thrust-angle control positions be present). In FIG. 12, propellers 112 and 114 are rotated backward by thrust-angle control positions 312 and 314, respectively, from the hovering thrust-angle base position. Propellers 116 and 118 are rotated forward by thrust-angle control positions 316 and 318, respectively, from the hovering thrust-angle base position. Drone 70 yaws to the right in response to the propellers being at the thrust-angle positions shown in FIG. 12. In some embodiments all four of these thrust-angle control positions may be equal to each other in magnitude.

The desired range of authority of thrust-angle motors is greater than the range between the hovering thrust-angle base positions and the translational thrust-angle base position (90 degrees). In FIG. 11, the thrust-angle position of propeller 116 is rotated forward from the translational thrust-angle base position to undergo a maneuver. As such the thrust-angle position of propeller 116 causes a slight negative lift, this is not a thrust-angle position that is sustained for a substantial period of time, mainly employed to complete a maneuver. In FIG. 12, another propeller thrust-angle position is shown that is outside of the range between the hovering and translational thrust-angle base positions. In particular, the thrust-angle position of propellers 112 and 114 are rotated backward from the hovering thrust-angle position, which results in the thrust being slightly reversed from the direction of what is normally set for translational flight. Again, some thrust-angle positions that are accessible via thrust-angle motors may be employed for brief periods to cause a particular maneuver. A range of 90 degrees plus at least 10 degrees on each end of the hovering and translational thrust-angle base positions yields a total range of control authority of at least 110 degrees for the thrust-angle motors to provide the desired functionality. The example of 10 degrees of rotation beyond the thrust-angle base hovering and translational positions is not intended to be limiting. Depending on the application, greater or lesser ranges of authority may be desirable. Also, depending on the application, it may be useful to allow a greater range beyond the translational thrust-angle base position than the hovering thrust-angle base position and vice versa in other applications.

Figure 13:
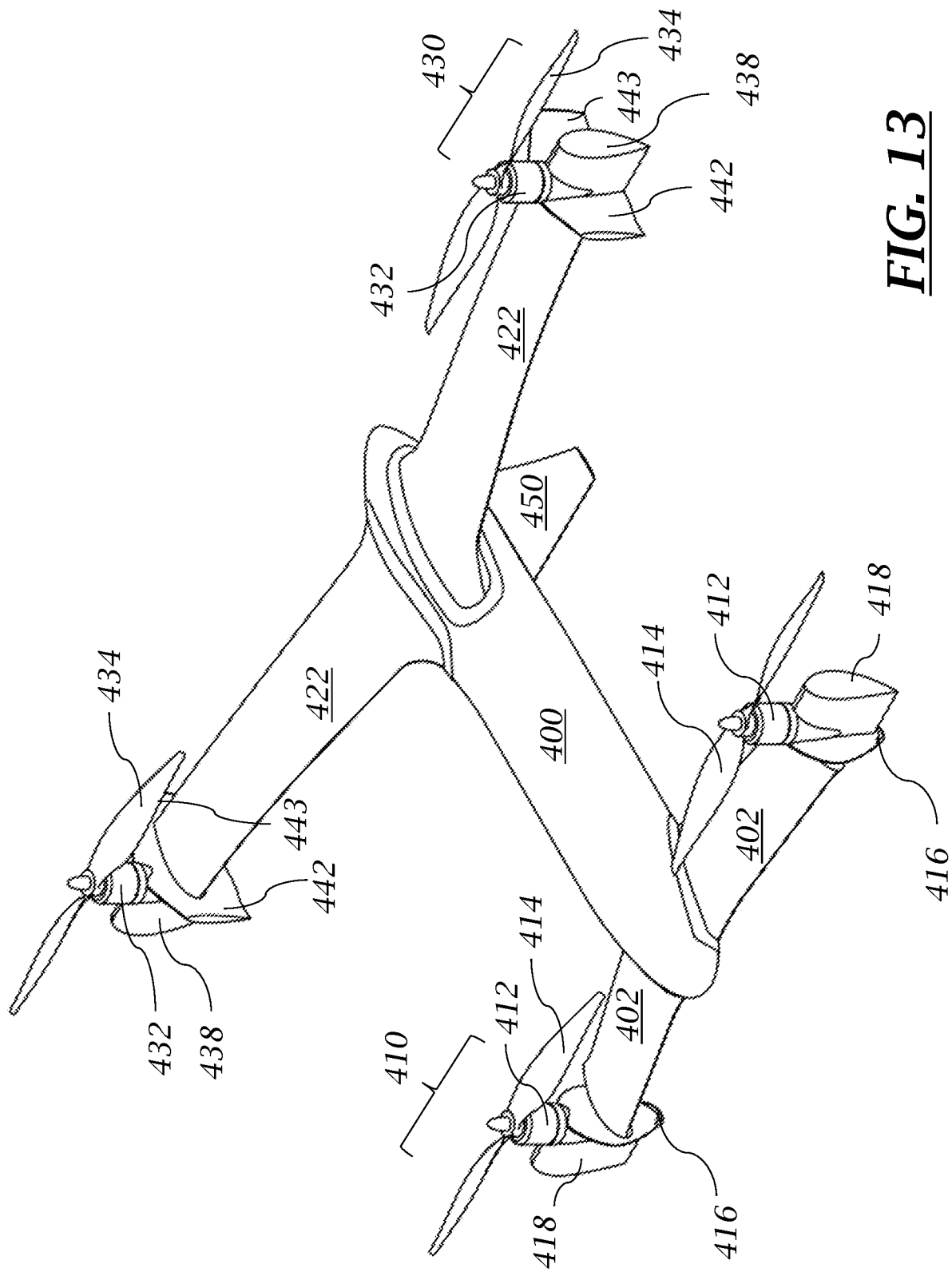
FIGS. 13 and 14 show an aeronautical apparatus in a vertical flight mode and a horizontal flight mode, respectively.

Referring to FIG. 13, an aeronautical apparatus is shown that has fore wings 402 and aft wings 422. An assembly 410 is coupled to a thrust-angle motor (not visible). Assembly 410 includes a propeller motor 412 with a propeller 414 attached thereto, a landing element 416, and a control surface 418. Landing element 416, in the embodiment in FIG. 13, is a wheel. Alternatively, landing element 416 is a landing foot or other suitable structure. An assembly 430 is coupled to each of aft wings 422. Assembly 430, associated with aft wings 422, includes a propeller motor 432, a propeller 434, a control surface 438, and a vertical stabilizer having portions 442 and 443, with portion 442 extending forward in vertical flight and portion 443 extending toward the back. All of control surfaces 418 and 438 are outboard of propeller motors 412 and 432, respectively.

A vertical stabilizer 450 is coupled near the aft of fuselage 400. Vertical stabilizer 450 extends downward vertically. The tip of stabilizer 450 serves as a landing foot when the aeronautical apparatus is on the ground. It is not suitable for vertical stabilizers 450 to extend downwardly from aeronautical apparatuses that take off and land in a conventional manner, meaning those that do not have vertical takeoff capability. Conventional aircraft roll backwards as they are lifting off the ground and would shear off vertical stabilizers that extend downwardly from the fuselage. However, the aeronautical apparatus in FIG. 13 has vertical takeoff capability so that vertical stabilizer 450 does not interfere with the ground during takeoff. The position of propeller motors 412 and 432 in FIG. 13 are for vertical flight.

Figure 14:
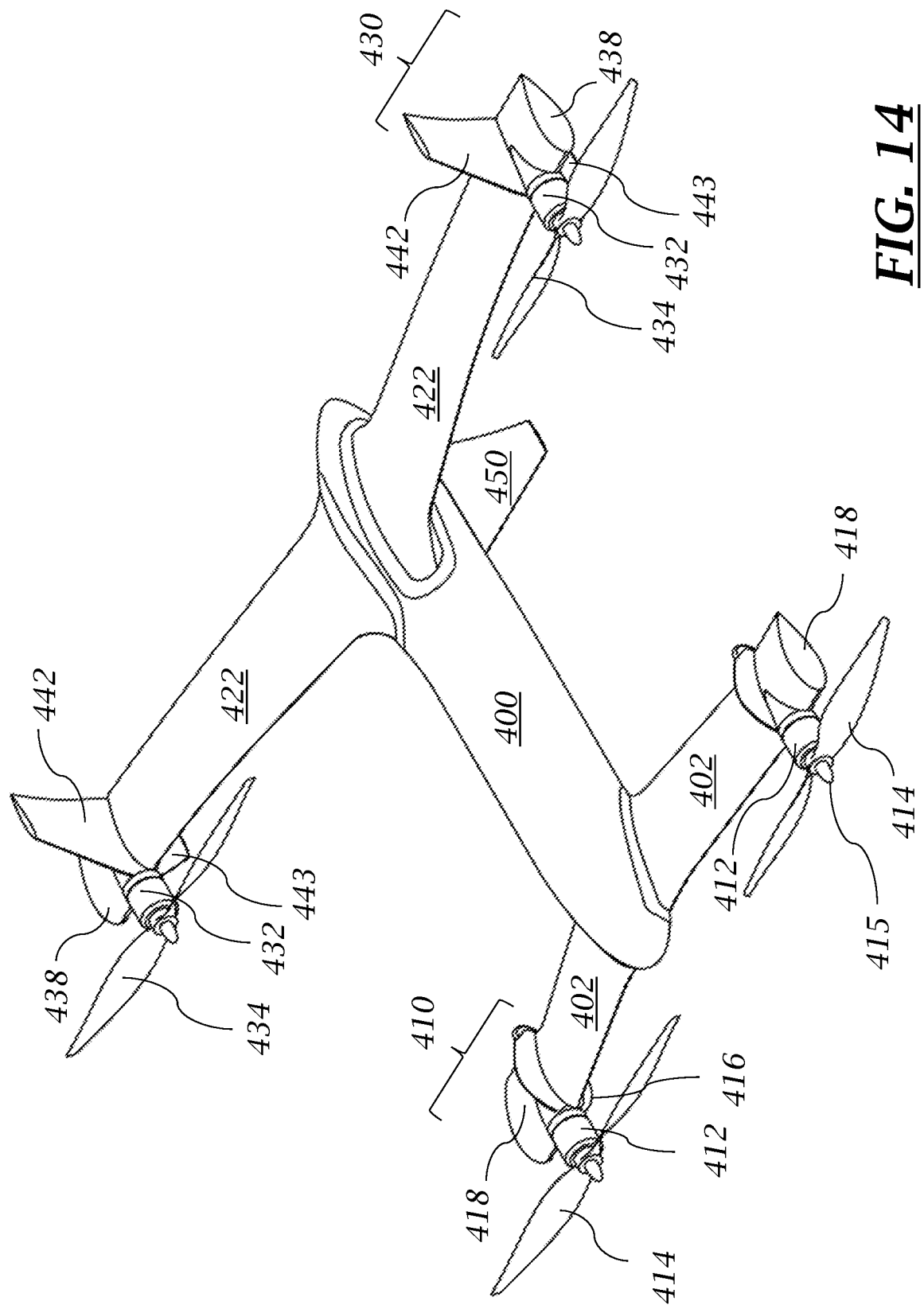

FIG. 14 shows the aeronautical apparatus of FIG. 13 when propeller motors 412 and 432 and propellers 414 and 434 are in a forward flight mode. Landing element 416 is at the aft of assembly 410 when in this mode to reduce drag in forward flight. A spinner 415 is shown in FIG. 14, a piece provided over the fore tip of center of propeller 414 to direct the flow efficiently to propeller 414. Spinners are also provided on aft propellers. In the forward flight position of assembly 410 (elements 412, 414, 415, 416, and 418), control surface 418 is an airfoil that provides lift similar to wing 402. Vertical stabilizers 442 and 443 are part of and rotate with assembly 430. In forward flight, as shown in FIG. 14, portion 442 of the vertical stabilizer extends upwardly and portion 443 of the vertical stabilizer extends downwardly.

A thrust-angle motor is used to pivot assembly 410 between the two positions shown in FIGS. 13 and 14, although not visible in either of FIG. 13 or 14. In FIG. 15, a portion of wing 402 is shown with assembly 410 coupled at the tip of wing 402. A thrust-angle motor 460 is shown disposed within wing 402. A shaft 462 is coupled between motor 460 and assembly 410. When motor 460 is actuated, shaft 462 rotates or pivots assembly 410. Another embodiment is shown in FIG. 16, in which motor 460 is disposed in fuselage 400. A shaft 464 couples between motor 460 and assembly 410. When motor 460 is actuated, shaft 464 rotates with respect to motor 460 and thereby rotates assembly 410. In yet another embodiment in FIG. 17, motor 460 is disposed within control surface 418 of assembly 410. A shaft 466 is disposed between wing 402 and motor 460. When motor 460 is actuated, shaft 466 remains stationary with wing 402 and motor 460 rotates with assembly 410. Slewing ring housing 448 is included in FIGS. 15 and 16. A slewing ring is discussed briefly above in relation to FIGS. 5 and 6.

An alternative embodiment of a portion of an aeronautical apparatus is shown FIG. 18. A portion of a fuselage 500 has a fore wing that is made up of a main wing portion 502 that is affixed to fuselage 500 and a cutout wing portion 520. Cutout wing portion 520 serves as a control surface. At the tip of main wing portion 502 is a nacelle 516 coupled to a propeller motor 512 that has a propeller 514. In other embodiments, nacelle 516 houses propeller motor 512. An assembly includes cutout wing portion 520, nacelle 516, propeller motor 512 and propeller 514. The assembly pivots when a thrust-angle motor (not shown in FIG. 18) pivots. In FIG. 19, the aeronautical apparatus of FIG. 18 is shown in which the assembly is partially pivoted away from the forward flight position shown in FIG. 18 toward a vertical flight position. The assembly, meaning elements 512, 514, 516, and 520, are rotated, along an axis, backward.

Referring now to FIG. 20, a portion of the aeronautical apparatus of FIGS. 18 and 19, shows a thrust-angle motor 560 disposed in main wing portion 502. A shaft 564 couples motor 560 with cutout wing portion 520 and a shaft 562 couples between nacelle 516 and motor 560. When thrust-angle motor 560 rotates, cutout wing portion 520 as well as nacelle 516 with propeller motor 512 and propeller 514 coupled thereto also rotate. Motor 560 has a rotating shaft that can be contiguous with shafts 562 and 564 or coupled to shaft 562 and 564. Herein, all shafts rotating together may be identified as multiple shafts or a single shaft.

In FIG. 21, an alternative embodiment is shown in which motor 560 is disposed in fuselage 500. A shaft 566 couples motor 560 with a cutout wing portion 520. A second shaft 568 couples cutout wing portion 520 with nacelle 516. An edge of cutout wing portion 520 effectively acts as a shaft that couples between shafts 566 and 568. Elements 512, 514, 516, 520, 566, and 568 rotate together. In FIG. 22, motor 560 is also located in fuselage like FIG. 21. Instead of cutout wing portion 520 acting as a portion of the shaft associated with motor 560, a single shaft 572 couples motor 560 with nacelle 516 and passes through cutout wing portion 520.

In FIGS. 21 and 22, an optional element 570 is provided which allows a differential rotation between nacelle 516 (which has the propeller motor 512 and propeller 514 affixed thereto) and cutout wing portion 520. In some embodiments, element 570 is a gear set. In another embodiment, element 570 is a four-bar linkage. In some embodiments, it is desirable for cutout wing portion 520 to rotate more than nacelle 516. In alternative embodiments, it is desirable for cutout wing portion 520 to rotate less than nacelle 516. Cutout wing portion 520 can be used to initiate maneuvers, such as a turn. The ratio is between one half and two. If the ratio is two, then the cutout wing portion 520 would fold completely onto main wing portion 502, i.e., the limit. If, for example, the ratio is 1.5, when motor 560 pivots 15 degrees, cutout wing portion 520 rotates 15 degrees while nacelle 516, propeller 514, and propeller motor 512 rotate 10 degrees. Rotating the propeller 514 off of an optimal position by 10 degrees may lead to a slight decrease in efficiency. However, using a single motor, i.e., thrust-angle motor 560 to control changes between vertical and horizontal flight as well as controlling other maneuvers obviates additional control surfaces and motors. The time spent in a maneuver is short compared to forward flight. Thus, a slight penalty having the propeller not optimally positioned during a short duration maneuver is overcome by the long duration forward flight without the weight and drag of the additional components.

Figure 23:
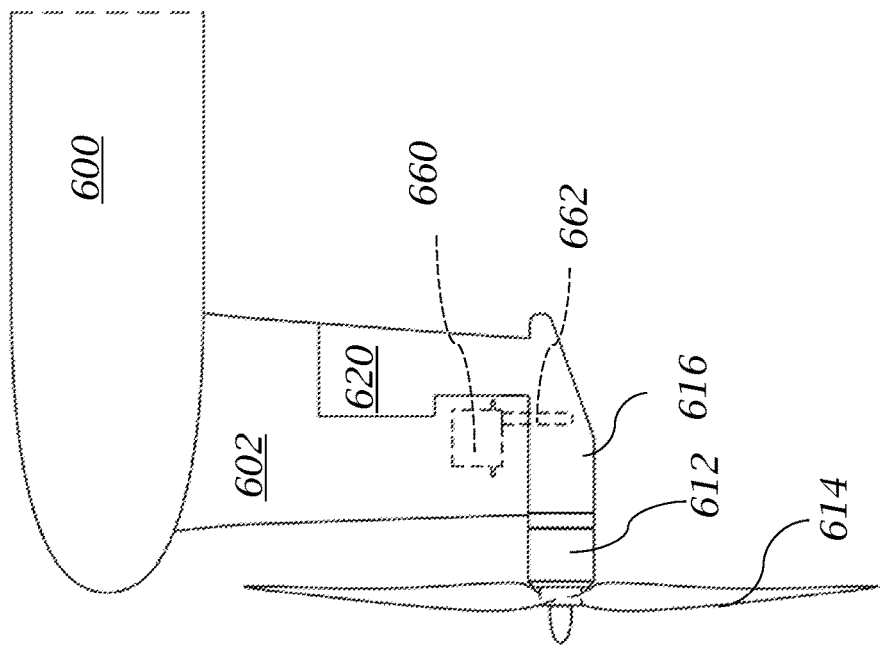
FIG. 23 shows a front portion of an aeronautical apparatus in a translational flight mode with the propeller motors rotated forward.

A portion of an aeronautical apparatus is shown in FIG. 23 that has a fixed wing portion 602 affixed to a fuselage 600 is shown in a forward flight mode. The wing includes fixed wing portion as well as a rotatable wing portion 620. Rotatable wing portion 620 is part of an assembly that also includes a nacelle 616, a propeller motor 612, and a propeller 614. The assembly is coupled to a thrust-angle motor 660 by a shaft 662. Rotatable wing portion 620 is a control surface.

Figure 24:
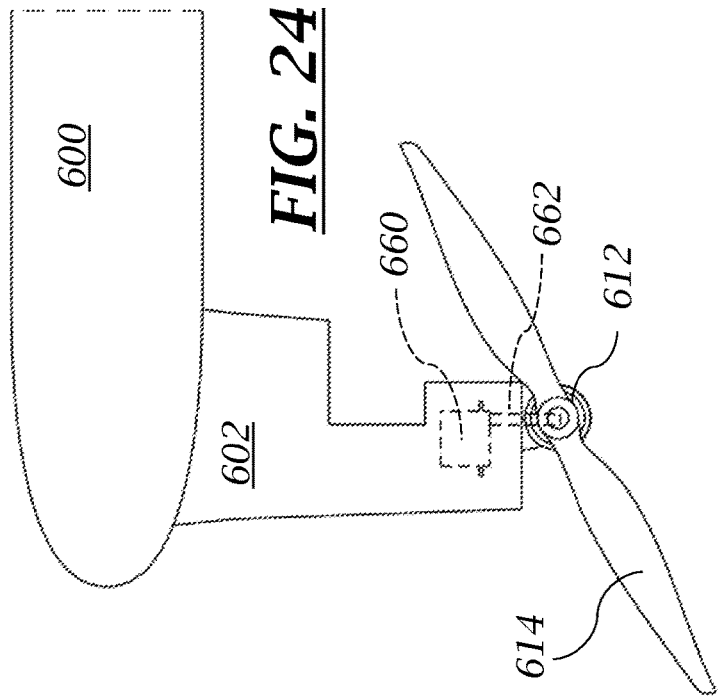
FIGS. 24 and 25 show the aeronautical apparatus portion of FIG. 23 in hover flight mode.
Figure 25:
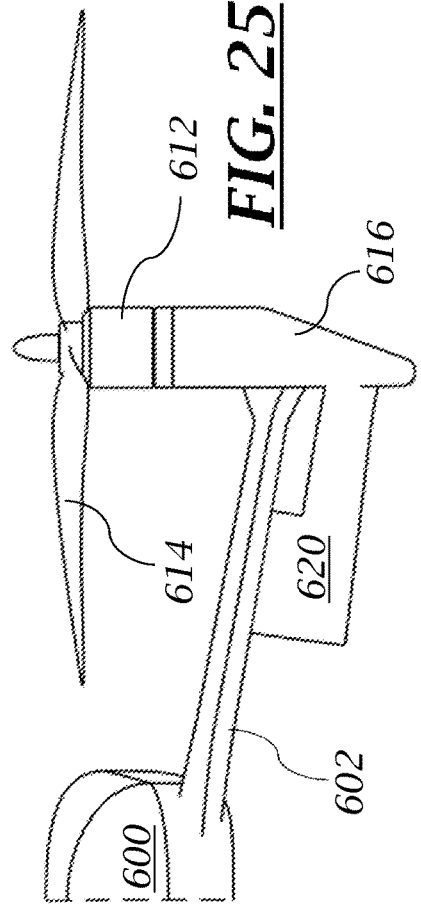

FIGS. 24 and 25 show the aeronautical apparatus portion of FIG. 23 in hover flight mode. The assembly (including elements 612, 614, 616, 620, and 662) is rotated.

Figure 27:
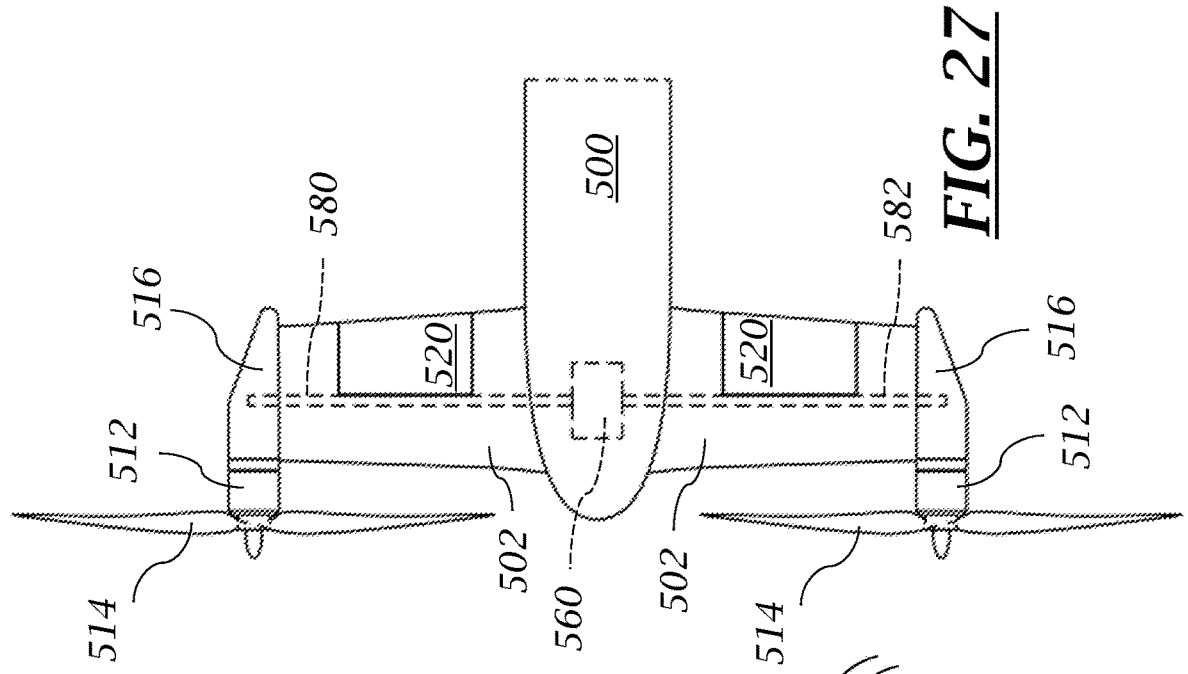
FIG. 27 shows the aeronautical apparatus portion of FIG. 18 with an alternate embodiment for the thrust-angle motor.
Figure 26:
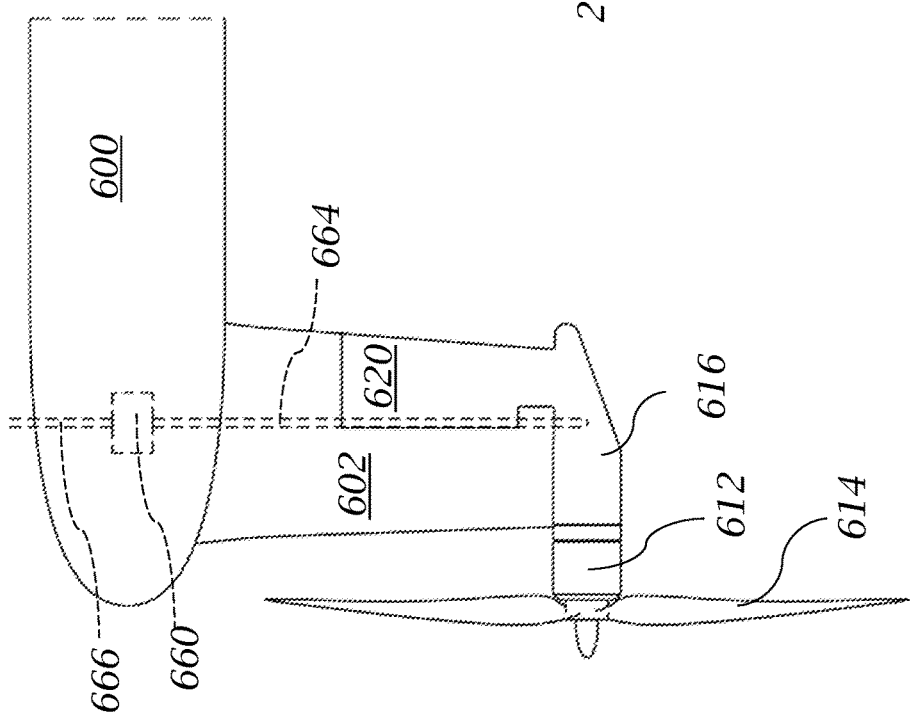
FIG. 26 shows the aeronautical apparatus portion of FIG. 23 with an alternate embodiment for the thrust-angle motor.

In FIG. 26, a variation of the aeronautical apparatus of FIGS. 23, 24, and 25 is shown. Motor 660 is disposed in fuselage 600. In the embodiment shown in FIG. 26, motor 660 is coupled to the assembly (elements 612, 614, 616, and 620) via a shaft 664. Motor 660 also couples with another analogous assembly (not shown in FIG. 26) that is provided on the wing on the other side of fuselage 600 coupled via shaft 666. One motor controls both assemblies, thereby obviating two motors to control the assemblies. In FIG. 27, an aeronautical apparatus as shown in FIGS. 18 and 19 is shown in which motor 560 is coupled to assemblies on the left and right sides of fuselage 500 via shafts 582 and 580 respectively. Embodiments in FIGS. 26 and 27 decrease the degrees of freedom to control the aeronautical apparatus. It is suitable with a four-wing arrangement in which aft wings provide adjustable control surfaces.

In FIG. 27 a computer 250 and a plurality of sensors 252 are shown communicating with each other and with the aeronautical apparatus. The communication illustrated is wireless communication. Any suitable wireless technology may be used. Sensors 252, alternatively, could be communicating with computer 250 with direct wire communications or could reside onboard computer 250. In yet other embodiments, computer 250 is any kind of suitable controller with computational capability. In other embodiments, a portion of the computing power and some of the sensors reside on the aeronautical apparatus and communicate wirelessly with ground-based controllers or operate autonomously.

An aft portion of an aeronautical apparatus is shown in FIG. 28. A fuselage is shown with a fixed portion of a wing 702 and a rotatable portion of a wing 720. Rotatable portion of the wing 720 is located on the trailing edge of the wing. An assembly includes rotatable portion of the wing 720, propeller motor 712, and propeller 714. The assembly is coupled to a thrust-angle motor 760 via a shaft 762.

FIG. 29 shows the aeronautical apparatus portion of FIG. 28 with folding propellers 718. As propeller motor 712 powers down in forward flight, propellers 718 are swept back by the flow air into a low drag configuration shown in FIG. 29. This is done to lower the rate of energy consumption in forward flight. In other embodiments propeller motor 712 is not powered down in forward flight.

Figure 30:
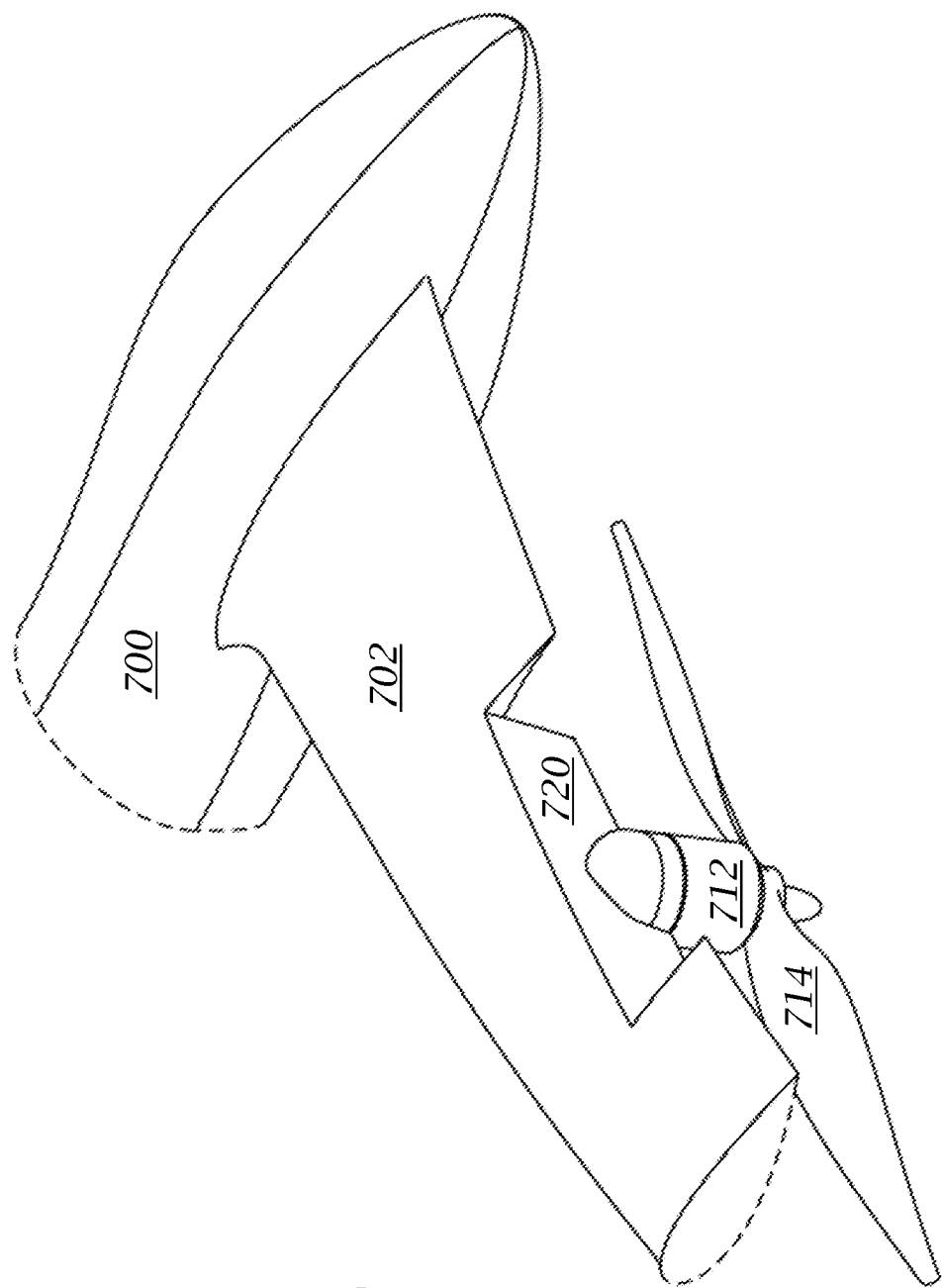
FIG. 30 shows the aeronautical apparatus portion of FIG. 28 in hover configuration.

FIG. 30 shows the aeronautical apparatus portion of FIG. 28 in hover flight mode in which the assembly is rotated. The assembly includes propeller motor 712, propeller 714, rotatable portion of the wing 720, and shaft 762.

Figure 31:
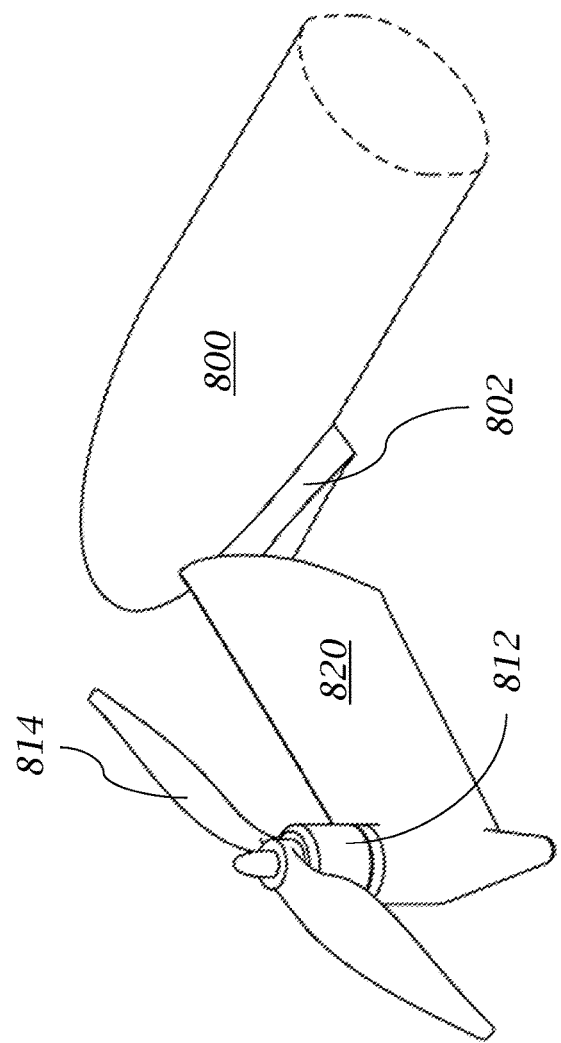
FIGS. 31 and 32 show a portion of an aeronautical apparatus in which the portion of the wing that rotates extends from the leading edge to the trailing edge.

A front portion of an aeronautical apparatus is shown in FIG. 31. A fuselage 800 is shown with a fixed portion of a wing 802 and a rotatable portion of the wing 820. Rotatable portion of the wing 820 extends from the leading edge of the wing to the trailing edge. An assembly includes rotatable portion of the wing 820, propeller motor 812, and propeller 814. The assembly is coupled to a thrust-angle motor (not shown in FIG. 31) via a shaft (not shown in FIG. 31).

Figure 32:
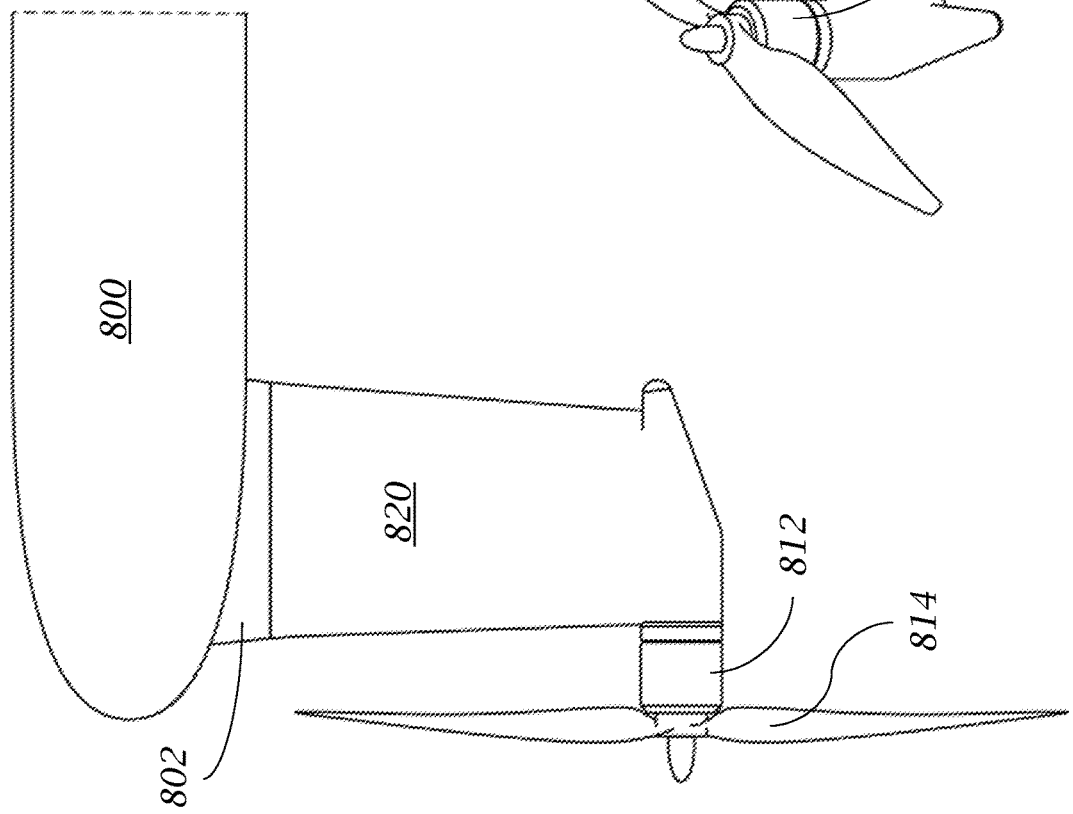

FIG. 32 shows the aeronautical apparatus portion of FIG. 31 in hover flight mode in which the assembly is rotated. The assembly includes propeller motor 812, propeller 814, and rotatable portion of the wing 820.

While the best configuration has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, efficiency, strength, durability, life cycle cost, marketability, speed, endurance, range, appearance, packaging, size, serviceability, weight, manufacturability, ease of assembly, etc. The embodiments described herein that are characterized as less desirable than other embodiments or prior-art implementations with respect to one or more characteristics are not outside the scope of the disclosure and may be desirable for particular applications.

We claim:

1. An aeronautical apparatus, comprising:
 a fuselage having a longitudinal axis and a lateral axis;
 a first wing coupled to a right side of the fuselage;
 a second wing coupled to a left side of the fuselage; and
 first and second thrust-angle motors each having an axis of rotation substantially parallel to the lateral axis of the fuselage;

first and second assemblies, wherein:
- the first assembly comprises: a first propeller motor with a first propeller coupled thereto and a first control surface;
- the second assembly comprises: a second propeller motor with a second propeller coupled thereto and a second control surface;
- the first thrust-angle motor is coupled between the first assembly and one of: the first wing and the fuselage;
- the second thrust-angle motor is coupled between the second assembly and one of: the second wing and the fuselage;
- the first wing is comprised of: a first fixed portion affixed to the fuselage and the first control surface;
- the second wing is comprised of: a second fixed portion affixed to the fuselage and the second control surface;
- the first assembly rotates with respect to the fuselage and with respect to the first fixed portion of the wing when the first thrust-angle motor is actuated;
- the second assembly rotates with respect to the fuselage and with respect to the second fixed portion of the wing when the second thrust-angle motor is actuated.

2. The aeronautical apparatus of claim 1, wherein:
the entirety of the first control surface is located outboard of the first propeller motor; and
the entirety of the second control surface is located outboard of the second propeller motor.

3. The aeronautical apparatus of claim 1, wherein:
the first assembly further comprises a first shaft coupled to the first control surface so that the first assembly rotates unitarily; and
the second assembly further comprises a second shaft coupled to the second control surface so that the second assembly rotates unitarily.

4. The aeronautical apparatus of claim 1, wherein:
the first control surface is coupled to the first assembly via a first differential rotational assemblage such that the first control surface rotates with respect to the first fixed portion of the first wing when the first thrust-angle motor is actuated;
the second control surface is coupled to the second assembly via a second differential rotational assemblage such that the second control surface rotates with respect to the second fixed portion of the second wing when the second thrust-angle motor is actuated;
the first differential rotational assemblage is one of: a first gearset and a first four-bar linkage; and
the second differential rotational assemblage is one of: a second gearset and a second four-bar linkage.

5. The aeronautical apparatus of claim 1, wherein:
the first assembly further comprises a first nacelle;
the first propeller motor is housed within the first nacelle;
the second assembly further comprises a second nacelle;
the second propeller motor is housed within the second nacelle;
an outboard end of the first control surface is affixed to the first nacelle; and
an outboard end of the second control surface is affixed to the second nacelle.

6. The aeronautical apparatus of claim 1, wherein:
the first thrust-angle motor is located in one of the fuselage, the first fixed wing portion, and the first assembly; and
the second thrust-angle motor is located in one of the fuselage, the second fixed wing portion, and the second assembly.

7. The aeronautical apparatus of claim 1, wherein:
the first assembly further comprises a first stabilizer; and
the second assembly further comprises a second stabilizer.

8. The aeronautical apparatus of claim 1, wherein:
the first propeller motor is coupled directly to the first control surface; and
the second propeller motor is coupled directly to the second control surface.

9. The aeronautical apparatus of claim 1, wherein:
the first assembly further comprises a first landing element;
the second assembly further comprises a second landing element;
the first landing element is one of a landing foot and a wheel; and
the second landing element is one of a landing foot and a wheel.

10. The aeronautical apparatus of claim 1, further comprising:
a third wing coupled to the right side of the fuselage;
a fourth wing coupled to the left side of the fuselage;
third and fourth thrust-angle motors having an axis of rotation substantially parallel to the lateral axis; and
third and fourth assemblies;
wherein:
- the third assembly comprises: a third propeller motor with a third propeller coupled thereto and a third control surface;
- the fourth assembly comprises: a fourth propeller motor with a fourth propeller coupled thereto and a fourth control surface;
- the third thrust-angle motor is coupled between the third assembly and one of: the third wing and the fuselage; and
- the fourth thrust-angle motor is coupled between the fourth assembly and one of: the fourth wing and the fuselage.

11. The aeronautical apparatus of claim 10, wherein:
the entirety of the first control surface is located outboard of the first propeller motor;
the entirety of the second control surface is located outboard of the second propeller motor;
the entirety of the third control surface is located outboard of the first propeller motor; and
the entirety of the fourth control surface is located outboard of the second propeller motor.

12. The aeronautical apparatus of claim 10, wherein:
the first assembly further comprises a first shaft coupled to the first control surface so that the first assembly rotates unitarily;
the second assembly further comprises a second shaft coupled to the second control surface so that the second assembly rotates unitarily;
the third wing is comprised of two portions: a third fixed portion affixed to the fuselage and the third control surface;
the third assembly further comprises a third shaft coupled to the third control surface so that the third assembly rotates unitarily;
the fourth wing is comprised of two portions: a fourth fixed portion affixed to the fuselage and the fourth control surface; and
the fourth assembly further comprises a fourth shaft coupled to the fourth control surface so that the fourth assembly rotates unitarily.

13. The aeronautical apparatus of claim 10, wherein:
the first control surface is coupled to the first assembly via a first shaft and a first differential rotational element such that the first control surface rotates with the first shaft in response to the first thrust-angle motor actuating;
the second control surface is coupled to the second assembly via a second shaft and a second differential rotational element such that the second control surface rotates with the second shaft in response to the second thrust-angle motor actuating;
the third wing is comprised of two portions: a third fixed portion affixed to the fuselage and the third control surface;
the third control surface is coupled to the third assembly via a third shaft such that the third control surface rotates with the third shaft in response to the third thrust-angle motor actuating;
the fourth wing is comprised of two portions: a fourth fixed portion affixed to the fuselage and the fourth control surface;
the fourth control surface is coupled to the fourth assembly via a fourth shaft such that the fourth control surface rotates with the fourth shaft in response to the fourth thrust-angle motor actuating;
the first differential rotational assembly is one of: a first gearset and a first four-bar linkage; and
the second differential rotational assembly is one of: a second gearset and a second four-bar linkage.

14. The aeronautical apparatus of claim 10, wherein:
the first thrust-angle motor is located in one of the fuselage, the first wing, and the first assembly;
the second thrust-angle motor is located in one of the fuselage, the second wing, and the second assembly;
the third thrust-angle motor is located in one of the fuselage, the third wing, the and the third assembly; and
the fourth thrust-angle motor is located in one of the fuselage, the fourth wing, the and the fourth assembly.

15. An aeronautical apparatus, comprising:
a fuselage having a longitudinal axis and a lateral axis;
first and third wings coupled to a right side of the fuselage;
second and fourth wings coupled to a left side of the fuselage;
first and second thrust-angle motors having an axis of rotation substantially parallel to the lateral axis of the fuselage;
a first assembly comprising: a first propeller motor with a first propeller coupled thereto and a first rotatable wing portion;
a second assembly comprising: a second propeller motor with a second propeller coupled thereto and a second rotatable wing portion;
the first propeller motor and the first assembly rotates with the first thrust-angle motor; and
the second propeller motor and the second assembly rotates with the second thrust-angle motor, wherein:
the first wing comprises a first fixed wing portion affixed to the fuselage and the first rotatable wing portion;
the second wing comprises a second fixed wing portion affixed to the fuselage and the second rotatable wing portion;
the first thrust-angle motor is coupled between: the first assembly and one of the fuselage and the first fixed wing portion; and
the second thrust-angle motor is coupled between: the second assembly and one of the fuselage and the second fixed wing portion.

16. The aeronautical apparatus of claim 15, wherein:
the first rotatable wing portion is a first control surface; and
the second rotatable wing portion is a second control surface.

17. The aeronautical apparatus of claim 15, further comprising:
a third assembly comprising a third propeller motor with a third propeller coupled thereto and a third rotatable wing portion;
a fourth assembly comprising a fourth propeller motor with a fourth propeller coupled thereto and a fourth rotatable wing portion, wherein
the third wing comprises a third fixed wing portion affixed to the fuselage and the third rotatable wing portion;
the fourth wing comprises a fourth fixed wing portion affixed to the fuselage and the fourth rotatable wing portion;
a third thrust-angle motor is coupled between the third assembly and one of: the third fixed wing portion and the fuselage; and
a fourth thrust-angle motor is coupled between the fourth assembly and one of: the fourth fixed wing portion and the fuselage
the third and fourth thrust-angle motors rotate with an axis of rotation parallel to the lateral axis;
the third assembly rotates with the third thrust-angle motor;
the fourth assembly rotates with the fourth thrust-angle motor;
the third propeller has blades which are hinged such that when folded, tips of the blades extend away from the third propeller motor; and
the fourth propeller has blades which are hinged such that when folded, tips of the blades extend away from the fourth propeller motor.

18. The aeronautical apparatus of claim 15, further comprising:
a third propeller motor with a third propeller coupled thereto;
a fourth propeller motor with a fourth propeller coupled thereto;
a third thrust-angle motor disposed in the fuselage and coupled to the third and fourth propeller motors, wherein:
the third thrust-angle motor rotates around an axis that is parallel to the lateral axis; and
the third and fourth propeller motors rotate in response to actuation of the third thrust-angle motor.

19. The aeronautical apparatus of claim 18, further comprising:
an electronic control unit (ECU) in electronic communication with: the first and second third thrust-angle motors and the first and second propeller motors; and
a plurality of sensors in electronic communication with the ECU, wherein:
the ECU commands: thrust-angle positions to the first and second thrust-angle motors and propeller speeds to the first and second propeller motors based on data from the plurality of sensors and a desired trajectory.

20. The aeronautical apparatus of claim 15, further comprising;
- a third assembly comprising: a third propeller motor with a third propeller coupled thereto and a third rotatable wing portion; and
- a fourth assembly comprising: a fourth propeller motor with a fourth propeller coupled thereto and a fourth rotatable wing portion, wherein:
  - a third thrust-angle motor is coupled between: the third assembly and one of: the fuselage and the third wing;
  - a fourth thrust-angle motor is coupled between: the fourth assembly and one of: the fuselage and the fourth wing;
  - the axis of rotation of the third propeller motor changes in response to actuation of the third thrust-angle motor; and
  - the axis of rotation of the fourth propeller motor changes in response to actuation of the fourth thrust-angle motor.

21. The aeronautical apparatus of claim 20, wherein:
the entirety of the first control surface is located outboard of the first propeller motor;
the entirety of the second control surface is located outboard of the second propeller motor;
the entirety of the third control surface is located outboard of the third propeller motor; and
the entirety of the fourth control surface is located outboard of the fourth propeller motor.

22. An aeronautical apparatus, comprising:
a fuselage having a longitudinal axis and a lateral axis;
a first wing coupled to a right side of the fuselage;
a second wing coupled to a left side of the fuselage;
a thrust-angle motor having an axis of rotation substantially parallel to the lateral axis of the fuselage;
a first assembly comprising: a first propeller motor with a first propeller coupled thereto and a first control surface; and
a second assembly comprising: a second propeller motor with a second propeller coupled thereto and a second control surface, wherein:
  the first wing comprises: a first fixed wing portion affixed to the fuselage and the first control surface;
  the second wing comprises; a second fixed wing portion affixed to the fuselage and the second control surface;
  the thrust-angle motor is disposed in the fuselage and is coupled to the first and second assemblies; and
  the first and second assemblies rotate in response to actuation of the thrust-angle motor.

* * * * *